(12) United States Patent
Stillerman

(10) Patent No.: US 11,934,968 B1
(45) Date of Patent: Mar. 19, 2024

(54) SYSTEM AND METHOD FOR ANTICIPATING ADVANCES IN TECHNOLOGY

(71) Applicant: Architecture Technology Corporation, Minneapolis, MN (US)

(72) Inventor: Matthew A. Stillerman, Ithaca, NY (US)

(73) Assignee: ARCHITECTURE TECHNOLOGY CORPORATION, Minneapolis, MN (US)

( * ) Notice: Subject to any disclaimer, the term of this patent is extended or adjusted under 35 U.S.C. 154(b) by 1163 days.

(21) Appl. No.: 15/872,645

(22) Filed: Jan. 16, 2018

Related U.S. Application Data

(60) Provisional application No. 62/543,931, filed on Aug. 10, 2017.

(51) Int. Cl.
*G06N 5/04* (2023.01)
*G06N 20/00* (2019.01)

(52) U.S. Cl.
CPC .............. *G06N 5/041* (2013.01); *G06N 20/00* (2019.01)

(58) Field of Classification Search
CPC .......... G06N 20/00; G06N 3/08; G06N 7/005; G06N 5/046; G06N 3/0454; G06N 5/003; G06N 5/022; G06N 3/049; G06N 3/084; G06N 5/045; G06N 3/006; G06N 3/04; G06N 3/0445; G06N 3/0472; G06N 3/0481; G06N 3/086; G06N 3/088; G06N 5/02; G06N 5/025; G06N 5/04; G06N 20/10; G06N 5/027; G06N 20/20; G06N 3/063; G06N 10/00; G06N 3/0427; G06N 3/0436; G06N 3/082

See application file for complete search history.

(56) References Cited

U.S. PATENT DOCUMENTS 9,177,249 B2    11/2015    Abercrombie et al.

OTHER PUBLICATIONS

Ritchey, Modeling Alternative Futures with General Morphological Analysis, 2011, World Future Review, pp. 83-94 (Year: 2011).*
Yoon et al., Development of New Technology Forecasting Algorithm: Hybrid Approach for Morphology Analysis and Conjoint Analysis of Patent Information, 2007, IEEE Transactions on Engineering Management, vol. 54, No. 3, Aug. 2007 (Year: 2007).*

(Continued)

*Primary Examiner* — Ann J Lo
*Assistant Examiner* — Charles C Kuo
(74) *Attorney, Agent, or Firm* — Shumaker & Sieffert, P.A.

(57) ABSTRACT

A method and system for determining predictably feasible model designs. The method includes defining a plurality of model designs, wherein the plurality of model designs include a plurality of infeasible model designs, wherein one or more of the infeasible model designs are infeasible due to limits in technology; storing information representing a plurality of technological trends; and classifying one or more of the infeasible model designs as predictably feasible model designs, wherein the predictable feasible model designs are those infeasible model designs expected to become feasible model designs if one or more of the plurality of technological trends continues as anticipated.

19 Claims, 18 Drawing Sheets

(56) References Cited

OTHER PUBLICATIONS

Kumar, Praveen et al., Review: Overcoming the Paradox of Strength and Ductility in Ultrafine-grained materials at low temperatures, Jun. 17, 2015, J Mater Sci (2016) 51:7-18 (Year: 2015).*
Jantsch, Erich, Technological Forecasting Persepective, 1967 (Year: 1967).*
Campbell, Matthew, A Validation Study of an Automated Concept Generator Design Tool, 2006 (Year: 2006).*
Ritchey et al., "Chapter 2—General Morphological Analysis (GMA)," Wicked Problems—Decision Support Modelling with Morphological Analysis Social Messes (Risk, Governance and Society), vol. 17, Jul. 8, 2011, pp. 7-18.
Alvarez et al., "Applications of General Morphological Analysis," Acta Morphologica Generalis, vol. 4, No. 1, Jan. 2015, 40 pp.
Ritchey, "Principles of Cross-Consistency Assessment in General Morphological Modelling," Acta Morphologica Generalis, vol. 4, No. 2, Dec. 10, 2012, 20 pp.
Ritchey, "General Morphological Analysis: A General Method for Non-Quantified Modelling," Swedish Morphological Society, Mar. 15, 2002, 10 pp.

* cited by examiner

Features in conflict

| | Weight | Length | Speed | Force | Duration | ... |
|---|---|---|---|---|---|---|
| Weight | + | P15, P8 | P2 | P18, P37 | P5 | |
| Length | P15, P8 | + | | | | |
| Speed | P2 | | + | etc | | |
| Force | P18, P37 | | | + | | |
| Duration | P5 | | etc | | + | |
| ... | | | | | | ... |

Features in conflict

400

P15. Dynamics
P8. Anti-weight
P2. Taking out
P37. Thermal expansion

Example inventive principles

FIG. 5

| FEATURES | 1 | 2 | 3 | 4 | ••• | 36 | 37 | 38 | 39 |
|---|---|---|---|---|---|---|---|---|---|
| 1: WEIGHT OF MOVING OBJECT | - | - | 15 8 29 34 | - | | 20 19 30 34 | 19 35 16 | 28 2 17 | 28 35 34 |
| 2: WEIGHT OF STATIONARY | - | - | - | 10 1 29 35 | | 7 23 | 35 3 15 23 | 2 | 28 10 29 35 |
| 3: LENGTH OF MOVING OBJECT | 8 15 29 34 | - | - | - | | 35 10 28 24 | 35 18 10 13 | 35 10 18 | 28 35 10 23 |
| 4: LENGTH OF STATIONARY | - | 35 28 40 29 | - | - | | - | 35 33 | 35 | 13 23 15 |
| ••• | | | | | | | | | |
| 36: DEVICE COMPLEXITY | 26 30 34 36 | 2 26 35 39 | 1 19 26 24 | 26 | | - | 15 10 37 28 | 15 1 24 | 12 17 28 |
| 37: DIFFICULTY OF DETECTING | 27 26 28 13 | 6 13 28 1 | 16 17 26 24 | 26 | | 15 10 37 28 | - | 34 21 | 35 18 |
| 38: EXTENT OF AUTOMATION | 28 26 18 35 | 28 26 35 10 | 14 13 17 28 | 23 | | 15 24 10 | 34 27 25 | - | 5 12 35 26 |
| 39: PRODUCTIVITY | 35 26 24 37 | 28 27 15 3 | 18 4 28 38 | 30 7 14 26 | | 12 17 28 24 | 35 18 27 2 | 5 12 35 26 | - |

FIG. 7

SYSTEM AND METHOD FOR ANTICIPATING ADVANCES IN TECHNOLOGY

This application claims the benefit of U.S. Provisional Application No. 62/543,931 filed Aug. 10, 2017, which is incorporated herein by reference in its entirety.

GOVERNMENT RIGHTS IN THE INVENTION

This invention was made with government support under Contract No. HDTRA 1-17-P-0013 awarded by the Defense Threat Reduction Agency. The government has certain rights in this invention.

FIELD OF THE INVENTION

The disclosure relates to categorizing objects based on attributes, and more particularly to methods of classifying design models based on trend information.

BACKGROUND

Technology tends to advance in fits and starts, marked by jumps in innovation followed by incremental improvement. It can be difficult to build a picture of the technological trends and technological advancements that will fuel, within a technology, the next round of innovation. Yet, to avoid being blindsided, organizations such as companies and government entities must take steps to anticipate future acts of creativity. Unanticipated new technologies may be disruptive to well-established business models. Companies try, therefore, to anticipate such technology advancements in order to make investment decisions and to avoid surprising losses of market share and revenue. The fiber optic industry failed to recognize this possibility in the early 2000's when they produced and installed a large quantity of optical fiber in anticipation of high demand for network bandwidth. The fiber optic industry did not realize that existing, already installed, fiber cable could be used with new modulation technology to meet the expanding demand. The result was over-capacity, "dark fiber," and bankruptcy. Unpredictable new technologies may also be disruptive to governments, and may even threaten a country's security.

Current approaches to anticipating technological advances are, for the most part, ad-hoc; when performed they typically require a team of subject matter experts, who attempt to leverage subject matter expertise in the core and related technologies to identify possible areas of technological advancement. Such approaches depend heavily on the span of knowledge of the experts used. And such approaches require expensive, large-scale, open-ended exploration by individuals with a broad scope of technical expertise to tease out technologies that will enable future innovations. The task becomes more difficult as one attempts to anticipate surprising or non-intuitive innovation or innovation arising from an enabling technology from farther afield.

SUMMARY

Various example implementations of this disclosure include systems, methods, devices, and techniques for analyzing a broad range of technologies and technological trends to discover surprising or non-intuitive new technologies before the technology may even be feasible. Such techniques may be used, for example, to anticipate technological innovation and to prepare applications for and countermeasures against the new technologies before the threats can be developed and deployed by others. Such techniques may also be used to anticipate potential threats enabled by incipient new technologies.

In one example approach, a system includes one or more processors and one or more memory components operably coupled to the one or more processors. The one or more processors are configured to define, in one or more of the memory components, a plurality of model designs, wherein the plurality of model designs includes a plurality of infeasible model designs, wherein one or more of the infeasible model designs are infeasible due to limits in technology; store, in one or more of the memory components, information representing technological trends; and classify one or more of the plurality of infeasible model designs as predictably feasible model designs, wherein the predictably feasible model designs are those infeasible model designs expected to become feasible model designs if the one or more of the technological trends continue as anticipated.

In another example approach, a method includes defining a plurality of model designs, wherein the plurality of model designs include a plurality of infeasible model designs, wherein one or more of the infeasible model designs are infeasible due to limits in technology; storing information representing a plurality of technological trends; and classifying one or more of the infeasible model designs as predictably feasible model designs, wherein the predictable feasible model designs are those infeasible model designs expected to become feasible model designs if one or more of the plurality of technological trends continues as anticipated.

In yet another example approach, a computer-readable data storage device stores instructions that, when executed, cause a computing device comprising one or more processors to define, in one or more of memory components, a plurality of model designs, wherein the plurality of model designs includes a plurality of infeasible model designs, wherein one or more of the infeasible model designs are infeasible due to limits in technology; store, in one or more of the memory components, information representing technological trends; and classify one or more of the plurality of infeasible model designsas predictably feasible model designs, wherein the predictably feasible model designs are those infeasible model designs expected to become feasible model designs if one or more of the technological trends continue as anticipated.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 5 is a conceptual diagram illustrating conflict resolution via TRIZ using a small subsection of a TRIZ conflict matrix, in accordance with aspects of the present disclosure.

FIG. 7 is a conceptual diagram illustrating an example matrix of a systematic framework for evaluating areas of resolution of conflicting design goals in an engineering design model, based on a TRIZ framework, in accordance with aspects of the present disclosure.

DETAILED DESCRIPTION

Figure 1:
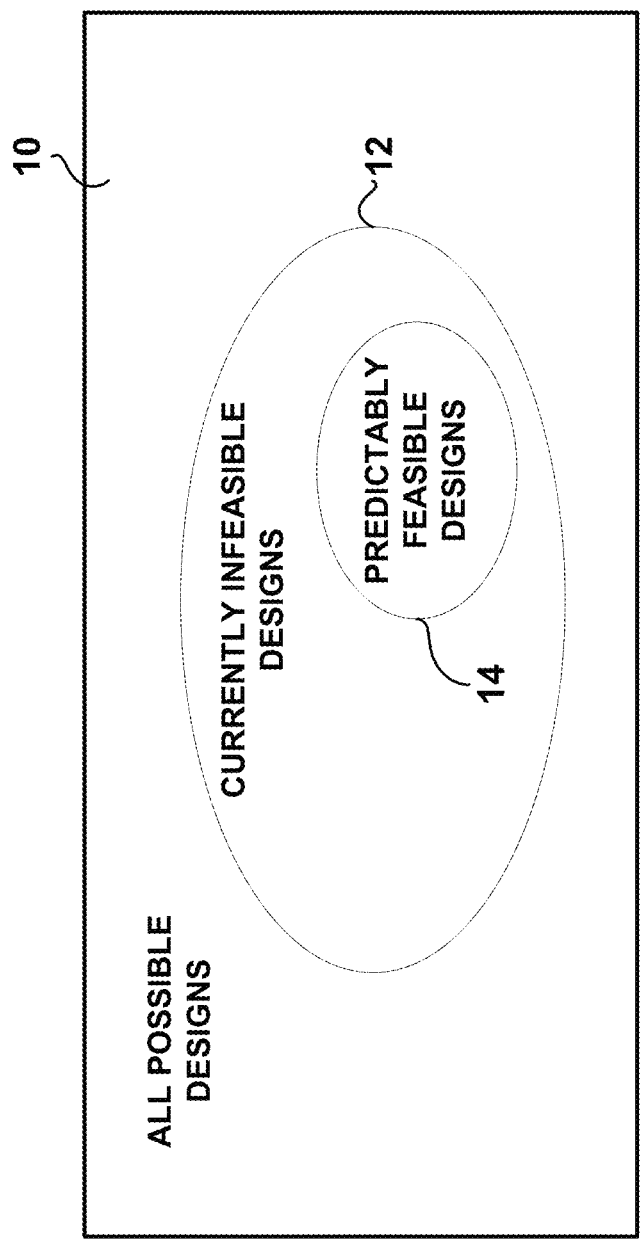
FIG. 1 is a Venn diagram illustrating an example design space, in accordance with aspects of the present disclosure.

The following disclosure details systems, methods, devices, and techniques for analyzing a broad range of technologies and technological trends to identify, based on current technology and current and anticipated technological trends, technology innovations that may be surprising or non-intuitive and that are not currently feasible but that are predicted to become feasible as technological trends achieve their anticipated results. In one example approach, subject matter experts (SMEs) develop a general model of a technology design space and identify technological trends relevant to the technology design space. In return, the experts receive summaries of novel combinations that the trends will enable and an identification of scientific discoveries with potential for spurring innovation. Entities such as companies or governmental agencies may use such analyses to anticipate technological innovation and to prepare applications for and countermeasures against the new technologies.

The problem of anticipating future innovation enabled by technology evolution has two parts: (1) early identification of technological trends and their endpoints, and (2) understanding the future impact of those trends, particularly where they combine to enable new, non-obvious inventions. To illustrate this point, consider that the fiber optic companies mentioned earlier were all extremely familiar with both the technological trend of improved modulation and the industrial context, but were blindsided nonetheless by the combination of the new modulation technologies with previously installed fiber optic cable. To avoid technology surprises, these companies needed to anticipate that future improvements to modulation (clearly foreseeable) would interact with the increasing pace of fiber installation, to result in overcapacity. Once these trends played out, it was already too late.

This form of technology forecasting is often difficult and ineffective, particularly when carried out as an ad hoc, manual process. First, competent forecasters are difficult to find. Such forecasters must be well-versed in multiple areas of technology so that they are prepared to combine results, both current and predicted, from across all fields. They must also be experts in the target area (e.g., launch vehicles, or weapons of mass destruction (WMD)). And, at the same time, they must be inventive or creative, because the real danger lies in non-obvious combinations of predicted and current technologies. The ad-hoc method, therefore, requires a very unusual, talented person, who would command a high price, if such a person could even be found. Second, since this form of technology forecasting usually involves exploring a huge design-space arising from combinations of technological trends, such analysis quickly scales beyond the abilities of a single forecaster, no matter how competent. An unstructured exploration by a human expert is just not practical at such a large scale.

What is described below is a system and method of forecasting that systematically searches for non-obvious future inventions, and that automates parts of the analysis for improved scalability. The techniques move away from a reliance on multi-talented experts, relying instead on the use of subject-matter expertise (human or machine learning based) in each technology to identify and characterize individual trends within that technology. The techniques then attempt to determine the impact, if any, each indentified technological trend will have on an area of concern or interest. This approach attempts to answer the following questions: 1) If known technological trends eventually reach their predicted endpoints, will those results, either singly or in combination, impact the target area of concern? and 2) Will they enable an innovation in the target area that is not currently feasible? Any such innovations are termed "predictedly feasible designs"; the risk-monitoring organization can then anticipate and prepare for such designs.

In one example approach, a method for identifying predictably feasible designs includes establishing a model of a design space, wherein the model includes a plurality of model designs, wherein the plurality of model designs include one or more infeasible model designs, wherein the one or more infeasible model designs are infeasible due to limits in technology.

The method further includes storing information representing one or more technological trends and identifying, from the one or more infeasible model designs, one or more predictably feasible designs, wherein the predictable feasible designs are those infeasible designs expected to become feasible designs if one or more of the plurality of technological trends continues as anticipated. In one such example approach, establishing the model of the design space includes identifying a reason one or more of the infeasible designs is not currently feasible while identifying one or more predictably feasible designs includes determining if one or more of the technological trends address the reason one of the infeasible designs is not feasible. In another such example approach, establishing the model of the design space includes defining morphological models of feasible and infeasible designs within the design space, wherein defining morphological models includes identifying a reason one or more of the infeasible designs is not currently feasible and wherein identifying one or more predictably feasible designs includes determining if one or more of the technological trends address the reason one of the infeasible designs is not feasible.

In one example approach, a method includes defining a plurality of model designs, wherein the plurality of model designs include a plurality of infeasible model designs, wherein one or more of the infeasible model designs are infeasible due to limits in technology. The method further includes storing information representing a plurality of technological trends and classifying one or more of the infeasible model designs as predictably feasible model designs, wherein the predictable feasible model designs are those infeasible model designs expected to become feasible model designs if one or more of the plurality of technological trends continues as anticipated.

In one such example approach, the plurality of infeasible model designs include a first infeasible model design, wherein the first infeasible model design is not feasible due to limits in technology. Furthermore, defining the plurality of model designs includes identifying a technological reason why the first infeasible design is not currently feasible and classifying one or more of the predictably feasible designs includes determining if one or more of the plurality of technological trends address the technological reason why the first infeasible model design is not feasible.

FIG. 1 is a Venn diagram illustrating an example design space 10, in accordance with aspects of the present disclosure. Design space 10 defines the universe of all possible designs for a particular technological solution, including feasible and currently infeasible designs. For example, lifting a payload into space using a launch vehicle with a chemical propellant is generally considered feasible, while lifting a payload into space using a rail gun or an antigravity device is generally considered to be infeasible. The universe 12 of currently infeasible designs for a particular technological solution is shown in FIG. 1. Universe 12 includes the universe 14 of predictably feasible designs. That is, currently infeasible designs that may become be feasible with the development of new technology or the application of existing technology in new ways.

Currently feasible designs, such as a design for lifting a payload into space using a launch vehicle with a chemical propellant, fall inside universe 10 but outside of universe 12. A currently infeasible design, such as a design for lifting a payload into space using a rail gun may fall into the universe 14 of predictably feasible designs, while most would place a design for lifting a payload into space using an antigravity device outside universe 14 but inside universe 12.

As noted above, it can be advantageous for organizations to anticipate technological change and the effect of that change may have on a particular technological solution. For instance, in the example above, rail gun launches of payloads into space are currently considered not feasible due to the muzzle velocity needed to lift the payload into space and the resulting heat faced by the payload (caused by friction as the payload passes through the atmosphere at such a high velocity). Advances in payload materials or payload design may, however, limit the friction or reduce its impact on the payload, turning a currently infeasible design into a feasible design. The trick is identifying the technological trends that may have a bearing on potentially feasible designs. To date, as noted above, such analysis has been ad-hoc, expensive and dependent on finding subject matter experts with broad knowledge in their area of subject matter expertise and in other, related, subject matter areas. As such, the breadth and scope of the discovery effort may be limited by the scope of knowledge of the subject matter experts.

FIGS. 2A-2D are conceptual diagrams illustrating example technology tracking systems 100, in accordance with aspects of the present disclosure. In the example approach of FIG. 2A, technology tracking system 100 includes a designer engine 102 and a model conflict resolution engine 104. Designer engine 102 defines the universe 10 of possible designs for a particular technology and identifies the infeasible designs. Infeasible designs tracked by designer engine 102 are fed to model conflict resolution engine 104, which also receives updates on trends from, for instance, subject matter experts (SMEs). Model conflict resolution engine 104 determines, based on analysis of the trends, the infeasible designs will become feasible if the related trends continue. In one example approach, model conflict resolution engine 104 outputs summaries of the predictable feasible designs that the trends will enable.

In general, designer engine 102 operates to define the universe of possible designs and to identify designs that currently are not feasible. Model conflict resolution engine 104 acts on the infeasible designs to determine designs that are currently not feasible but which may become feasible based on the technological trends. In one example approach, designer engine 102 treats designs that currently are not feasible as conflicts; model conflict resolution engine 104 determines, based on the technological trends, which conflicts can be handled. The result is a list of predictably feasible designs (universe 14).

Figure 2A:
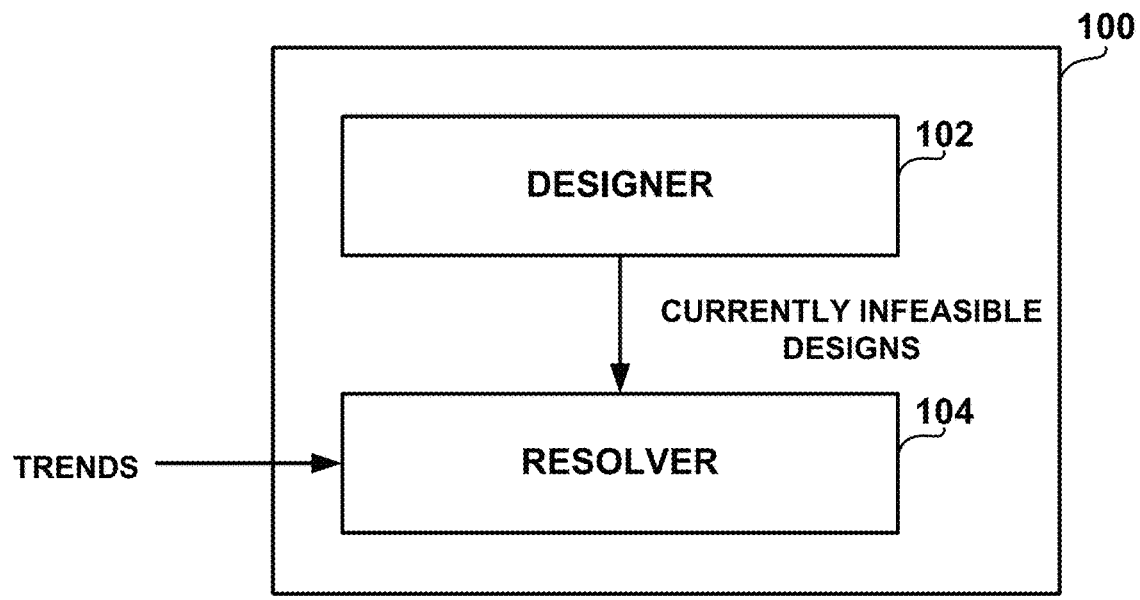
FIGS. 2A-2D are conceptual diagrams illustrating example technology tracking systems, in accordance with aspects of the present disclosure.
Figure 2B:
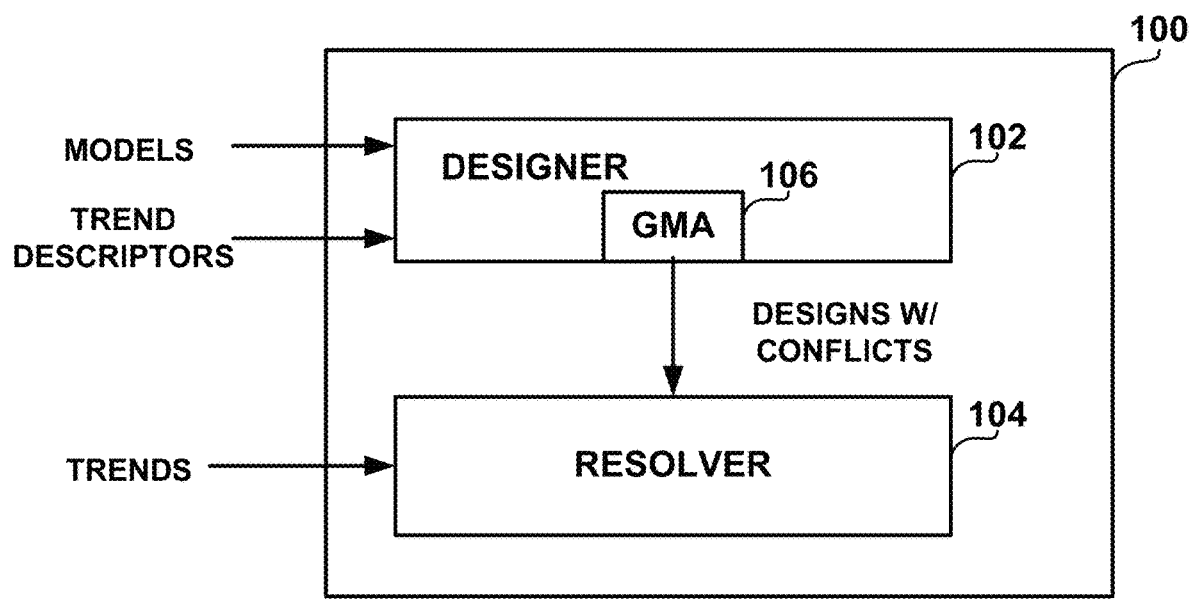

In the example approach of FIG. 2B, designer engine 102 includes a morphological analysis engine 106. In one such example approach, morphological analysis engine 106 receives and stores design models and technological trend descriptors and uses the models and trend descriptors to determine infeasible designs. In one example approach, morphological analysis engine 106 defines a large combinatorial design space (e.g., universe 10). In typical usage, most of a design space is deemed infeasible (universe 12) because of pairwise incompatibility of design choices; that is, a point in the design space is infeasible because of a conflict between two of its implicit design choices.

In a typical design, innovation is sought in the feasible region (e.g., outside of universe 12). That is, inventors try to invent something that is currently feasible by assembling existing elements in a novel way to accomplish something new. Occasionally people will speculate about new innovations that would be feasible if only capabilities X, Y, and Z were possible. But, usually, such speculation is in the context of an argument for why an organization should be working on developing X, Y, and Z.

In contrast, technology tracking system 100 focusses on the infeasible region (universe 12) because, lurking there, are innovations that will become feasible as technological trends play out. For example, capabilities X, Y, and Z may currently not be possible; technology developments, however, in X, Y and Z may, when completed, make a currently infeasible design feasible. Technology tracking system 100 therefore provides an early "heads up" about anticipated technology, and about scientific discoveries with potential for specific and novel forms of technology, with a focus on new forms of technological solutions, rather than incremental enhancements to existing solutions. In one example approach, analysts (SMEs) enter the characteristics of a technological trend into technology tracking system 100, which combines the trend with previously entered trends, and with a general model of the technological design space (e.g., methods of launching payloads into space). Technology tracking system 100 then outputs summaries of the novel combinations that these trends enable, in a form that is suitable for further study. In one example approach, the analysis is automated and systematic, and does not require SMEs with multi-domain knowledge.

In one example approach, analysts use morphological analysis engine 106 to establish a large combinatorial design space that defines various solutions to the same technical problem in terms of the characteristics of the solutions to the technical problem (e.g., universe 10). Some of the solutions are feasible but a portion the design space contains solutions that currently are not feasible (universe 12). In some cases, this infeasibility may be because of pairwise incompatibility between characteristics of the design. That is, a point in the design space may be infeasible because a conflict exists between two or more of its implicit design choices. These "infeasible points" within the design space are the locus of truly surprising innovations when technical and scientific advances (that can be anticipated) make them feasible. In one example approach, model conflict resolution engine 104 analyzes the reasons for infeasibility of the infeasible set, and predicts which of these designs will become feasible due to technological trends whose descriptions are inputs to the designer and model conflict resolution engines.

In one example approach, morphological analysis engine 106 provides a mechanism for speculating on device models and technological trends. In contrast, to the ad-hoc approaches discussed above, this mechanism provides 1) a structured and systematic way of speculating and 2) a mechanism for connecting an existing technological trend (that may have been characterized by someone else) to preconditions of our approach (e.g., the capabilities X, Y, and Z discussed above).

In one such example approach, morphological analysis engine 106 uses a morphological model based on, for example, General Morphological Analysis (GMA) to define the technological possibilities in the target area, and the constraints that limit feasibility of those possibilities. GMA is a method for structuring and investigating the total set of relationships contained in multi-dimensional, non-quantifiable, problem complexes. Here, GMA functions by defining and exhaustively exploring a large combinatorial design space, providing a compact and comprehensible representation of very large sets of distinct possibilities. GMA, therefore, enables direct consideration of a wide class of feasibility-inhibiting constraints, without expansion of the set into an explicit list. Such set expansion, and item-by-item consideration is impractical at even moderate scales without a morphological modeling approach such as GMA.

Typically, investigators are interested in near-term solutions to current problems. Given that a large swatch of the design space in a universe of designs such as shown in FIG. 1 is deemed infeasible because of pairwise incompatibility of design choices; innovation is typically sought instead in the remaining feasible region. As noted above, technology tracking system 100 focusses instead on the designs located in the infeasible region (universe 12), exploring technological advances that may be needed to make currently infeasible designs feasible. In one example approach, a point in the GMA design space is labeled as "infeasible" when there is a conflict between two of its design choices. For instance, a design may not be feasible until a static component is longer without being heavier. In one example approach, the design conflict is submitted to model conflict resolution engine 104 to resolve in view of current technological trends. In one such example approach, model conflict resolution engine 104 compares the technology characteristics of the conflict in the design to the descriptions of previously known or input technological trends, to predict which conflicts will be resolved, and in what manner. Using these predictions, the system then identifies the infeasible designs that are predicted to become feasible (universe 14) if the relevant technological trends continue to develop as anticipated.

As noted above, these techniques review the infeasible points in the set of designs, and focus on the reasons for their infeasibility. To do this, in one example approach, system 100 tracks the constraints governing the target area and the reasons for those constraints. When a technological trend addresses one of these reasons, system 100 can predict that the reason for the constraint will not be operative in the future (i.e., the reason is predicted to be mitigated). When all the reasons behind a constraint are addressed by known trends, then system 100 can further predict that the constraint will be resolved. When all constraints of an infeasible design are resolved, the design is predictably feasible.

Other techniques can be used as well. For instance, in one example approach, subject matter experts analyze technological trends and characterize such trends based on factors such as subject matter and the time frame for the trend to develop. In one such example approach, the characterization further includes an assessment of the types of conflict pairs addressed by the technological trend. In one such example approach, model conflict resolution engine 104 applies the technological trend characterizations to conflict pairs of designs within the infeasible design space (universe 12) to determine if the trend addresses the conflict. When, as noted above, all the reasons behind a constraint are addressed by known trends, then system 100 can predict that the constraint will be resolved. When all constraints of an infeasible design are resolved, the design is predictably feasible. In one example approach, system 100 not only identifies designs that are predictably feasible in this manner but also predicts when the design will become feasible based on time frames associated with each of the relevant technological trends.

In another such example approach, an analyst constrains the analysis to a particular time frame. In one such approach, model conflict resolution engine 104 applies the technological trend characterizations to conflict pairs of designs within the infeasible design space (universe 12) to determine if the trend addresses the conflict within the desired time frame. If all conflict pairs of an infeasible design are resolved in this manner within the desired time frame, the infeasible design becomes "predictably feasible" within that time frame.

An important aspect of morphological modeling mechanisms such as GMA are that they systematize morphological thinking. Morphological thinking is a way of approaching any sort of problem-solving in which solutions are considered exhaustively and without bias. Morphological thinking provides a higher degree of assurance that the analysts have fully covered all of the present and future possibilities in the target area. In one example approach, system 100 includes methods for walking the analyst through the process, and documenting the process and result. In one such example approach, system 100 also enables an interactive exploration of the result, which may be complicated and otherwise difficult to understand. Successful use of GMA in this manner may, therefore, require training and practice in morphological thinking.

Figure 2C:
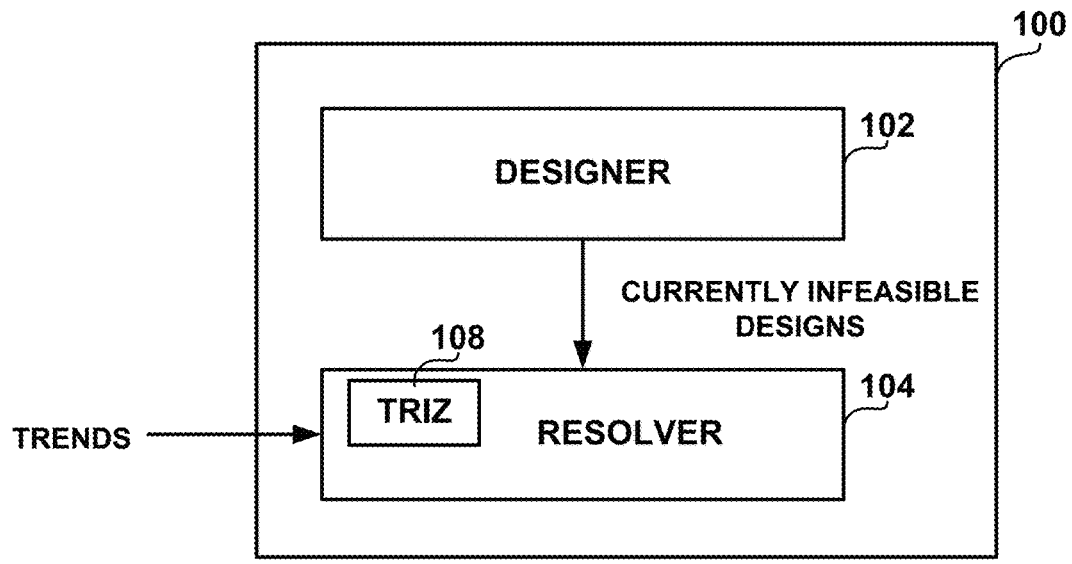

Another example technology tracking system 100 is shown in FIG. 2C. In the approach of FIG. 2C, technology tracking system 100 includes a designer engine 102 connected to a model conflict resolution engine 104. Once again, designer engine 102 defines the universe 10 of possible designs for a particular technology and identifies the infeasible designs. In the approach shown in FIG. 2C, designs that are not feasible are identified and the conflicting design choices that contribute to the design not being feasible are listed. Infeasible designs are fed to model conflict resolution engine 104, which also receives updates on trends from, for instance, subject matter experts (SMEs). In the example shown in FIG. 2C, model conflict resolution engine 104 includes a TRIZ engine 108 that determines, based on analysis of the trends and the design conflicts using the TRIZ framework, the infeasible designs that will become feasible if the related trends continue.

TRIZ is an acronym for a method of innovation or creative problem solving created by Genrich Altshuler. Although TRIZ encompasses several related techniques, the part of TRIZ that is relevant to model conflict resolution engine 104 is a technique for resolving contradictions (or "conflicts" in our terminology) that arise in engineering design. When the technique is successful, and if the result is sufficiently novel, then the resulting design is considered an invention. Genrich Altshuler studied tens of thousands of patents, and found that, a relatively small number of "inventive principles" underlie the innovation in most of them, with forty (40) such principles in all. Each such invention is innovative (i.e., not straightforward, and, presumably, not previously known) because it resolves a seemingly intractable conflict between two required aspects or consequences of the design. Such conflicts can be characterized as maintaining some design parameter X while altering some other design parameter Y, where these two requirements seem to be at odds with one another. Altshuler separated the relevant design parameters he found into thirty nine (39) categories, and found that, for a given pair of parameter categories, his example inventions only used a very small number of distinct innovative principles to resolve conflicts; usually not more than four principles. The TRIZ technique uses these findings as follows: The problem to be solved is construed as a conflict between two design parameters. The categories of the two parameters are determined, enabling a short list of relevant innovative principles to be looked up in a table. Each of these selected principles (which are quite abstract) is then applied to the specific conflict to generate candidate solutions. Finally, candidate solutions are each evaluated for feasibility and desirability.

In ordinary use, the candidate solutions generated by TRIZ must be feasible with current technology if they are to be considered as solutions. When TRIZ is used as part of model conflict resolution engine 104, the candidate solutions of interest are those that are not currently feasible. Each such infeasible candidate solution is, instead, considered as a description of a "resolving" technology or capability that would solve the problem (resolve the conflict) if it were feasible. Model conflict resolution engine 104 compares these resolving technologies or capabilities with information about actual technological trends that are input from a variety of sources. When an actual trend has a predicted endpoint that matches or encompasses a resolving technology or capability, then engine 104 "predicts" that that conflict will eventually be resolved through the evolution of that actual trend. Considering the multiplicity of conflicts engendering infeasibility in the model that are predicted to be resolved by current actual trends, model conflict resolution engine 104 then predicts which of the infeasible design points are thereby predicted to become feasible through the resolution of all of their conflicts. These design points are the predicted inventions output by technology tracking system 100.

In one example implementation of model conflict resolution engine 104 using TRIZ, in response to a conflict, the engine generates a "resolving trend." That is, a description of a plausible technological trend whose predicted endpoint would be a resolving technology or capability.

In one example implementation of model conflict resolution engine 104 that generates resolving trends, those resolving trends are output by technology tracking system 100 for external comparison with data about actual technological trends by either manual or automated means. Any resolving trends that are found to match actual technological trends by this external analysis are then indicated by inputs to technology tracking system 100, and thereby to model conflict resolution engine 104.

In a second example implementation of model conflict resolution engine 104 that generates resolving trends, data about actual technological trends is input to technology tracking system 100, and thereby to model conflict resolution engine 104. Model conflict resolution engine 104 then compares that data about actual technological trends with the resolving trends generated by engine 104.

Figure 2D:
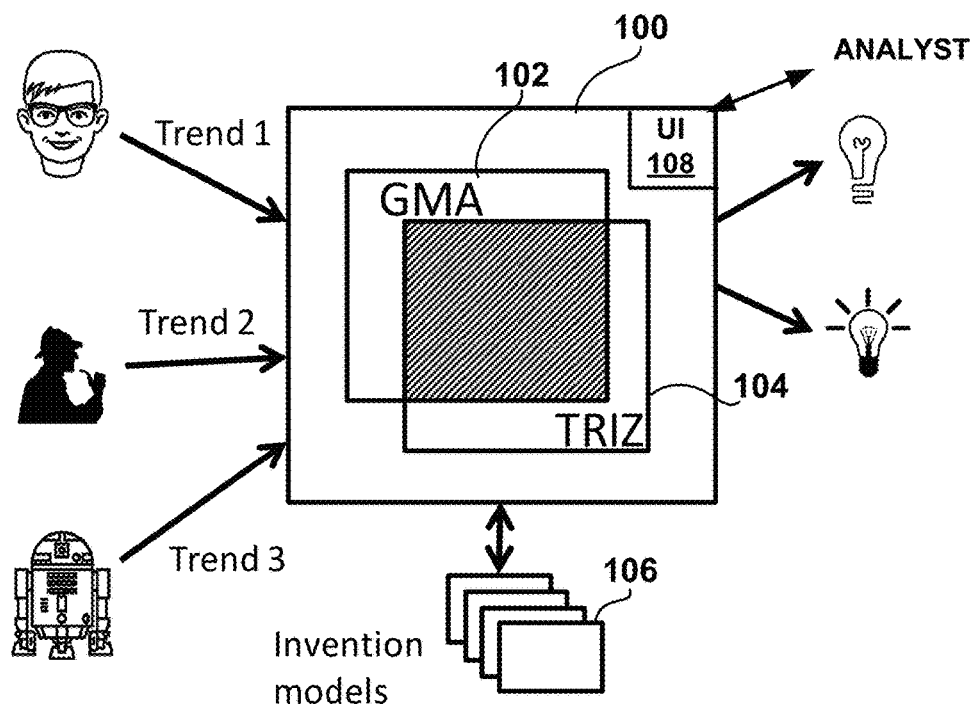

FIG. 2D illustrates another technology tracking system 100. In the example approach of FIG. 2D, technology tracking system 100 includes designer engine 102, a model conflict resolution engine 104, models 106 and user interface 108. In one such example approach, designer engine 102 is connected to models 106 and user interface 108 and receives design models and technological trend descriptors from user interface 108 that are stored, in turn to models 106. Once again, designer engine 102 defines a large combinatorial design space (e.g., universe 10). In typical usage, most of a design space is deemed infeasible (universe 12) because of pairwise incompatibility of design choices; that is, a point in the design space is infeasible because of a conflict between two of its implicit design choices.

Model conflict resolution engine 104 resolves the conflicts between design choices, identifying inventive principals that can resolve the conflict. In one such example approach, model conflict resolution engine 104 performs a problem solving methodology such as TRIZ. When considered in the context of a concrete design conflict, the TRIZ principle will reduce to specific technology characteristics that, if they existed, would solve the conflict.

In one example approach, a user analyzes the effects of technological developments on a design space by priming technology tracking system 100 with a set of models 106 that, in effect, define how to identify a solution. For example, an analyst may want to speculate as to what new forms of weapons of mass destruction (WMDs) may appear over the next ten years. A set of models are designed defining how to identify a solution (e.g., a new form of WMD). The analysts then apply abstract descriptors of technological trends, created by SMEs or generated by data mining of technical literature, to the models. The result is a set of potential new innovations, each of which satisfies one of the models. In one example approach, as shown in FIG. 2D, system 100 includes an active user interface 108 that supports navigation within the set of solutions, which could be large, and which uses natural language text generation to produce clear prose descriptions of each innovation. Analysts may then investigate and dismiss or handle each individual result (e.g., each potential new form of WMD).

Used in this way, technology tracking system 100 enables a much more thorough and rapid assessment of technological trends than might be possible with an ad hoc approach. In addition, system 100 makes effective use of technological trend descriptors produced by SMEs with narrow knowledge of their specialty (and, possibly, without any knowledge of WMDs), and from other sources, such as artificially intelligent data mining systems. In fact, the SME that produces a trend descriptor does not need to know how that trend might contribute to the development of a new form of a WMD or of any other end product. Nor would he or she need to know anything about other contributions with which the trend might interplay.

In one example approach, technology tracking system 100 maintains a representation of the entire design space associated with a model (e.g., for a form of WMD or for possible launch mechanisms). Designs that are not feasible are marked as conflicts and forwarded to model conflict resolution engine for resolution. When considered in the context of a set of trends that predict new forms of technology, analysts, therefore, can determine those design space points that may become feasible. These are the possible new innovations.

In one example approach, user interface 108 includes a graphical user interface used by analysts to create and maintain models and trend descriptors to navigate within the generated set of possible future innovations. In one such example approach, templates associated with each model 106 are used to generate natural language descriptions and explanations of innovations that fall within the generated set of possible future innovations.

In one example approach, user interface 108 includes a data entry user interface (UI) used by specialized SMEs or technology experts to enter data or information into technology tracking system 100. The data may include parameters or may include descriptions of specialized subject matter (e.g., computer security, or weapon countermeasures) or of technological trends (e.g., key parameters of available battery technology over time, such as the highest available power density per weight over time, lightest available battery of a given voltage over time).

In one example approach, user interface 108 includes a report generator used to output information on new technology predictions. In some such approaches, the report generator includes inputs used by a user to explore designs and technological trends and to facilitate further development and understanding of the new technology predictions generated by technology tracking system 100.

Figure 3:
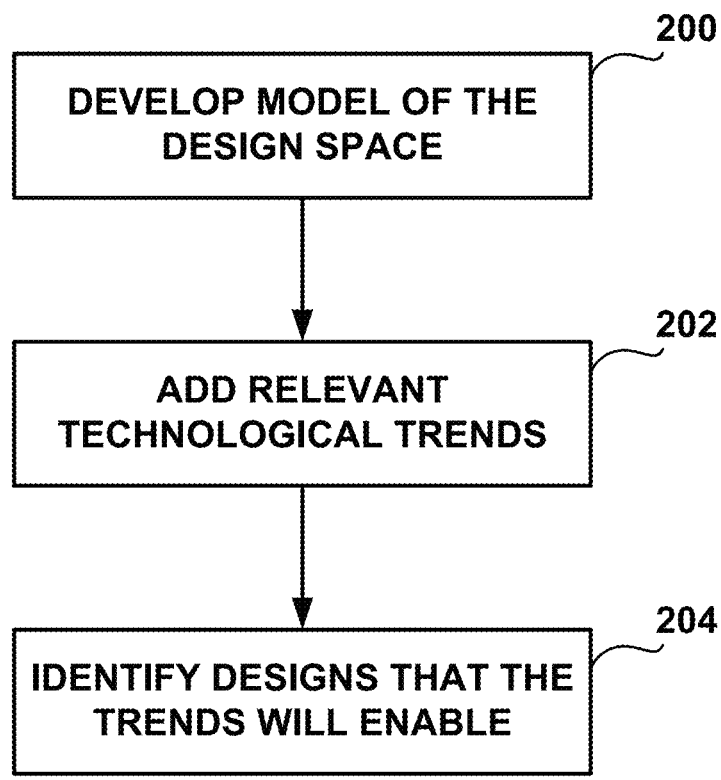
FIG. 3 is a flow diagram illustrating an example method of generating a set of possible future innovations, in accordance with aspects of the present disclosure.

FIG. 3 is a flow diagram illustrating an example method of generating a set of possible future innovations, in accordance with aspects of the present disclosure. At 200, an analyst develops a large combinatorial design space that defines various models of solutions to the same technical problem in terms of the characteristics of the solutions to the technical problem (e.g., universe 10). Some of the solutions are feasible but a portion the design space contains solutions that currently are not feasible (universe 12). At 202, technological tracking system 100 applies abstract descriptors of technological trends, created by SMEs or generated by data mining of technical literature, to the models. At 204, technological tracking system 100 combines the information on technological trends with the information on the conflicts in design choices for each model to picks out exactly those combinations (if any) that may become feasible if the trend continues.

In one example approach, technology tracking system 100 systematically searches through technical and patent literature to identify technological trends. In one such example approach, model conflict resolution engine 104 performs systematic searches for resolutions of design goals among conflicting engineering design constraints based on the technological trends discovered in the searches.

In various examples, technology tracking system 100 may be implemented as a software application or set of applications executed by a computing system. In addition, designer engine 102 and model conflict resolution engine 104 may be implemented as subsystems or libraries of the application or set of applications representing technology tracking system 100. In some examples, designer engine 102 may derive its models from modeling systems describing various areas of engineering design, including physics and mechanical and electrical engineering design modeling and simulation analysis tools; chemical engineering design modeling and simulation analysis tools; biological, medical, and genetic engineering design modeling and simulation analysis tools; and computer networking and software engineering design modeling and simulation analysis tools.

In some example approaches, technology tracking system 100 may provide advance indication about potential new technologies and scientific discoveries with potential for novel forms of disruption or threat and, by doing so, may help organizations avoid future problems by identifying non-obvious innovations that may become feasible due to technical trends. In some example approaches, technology tracking system 100 systematically combines technological trend information across disparate fields, from sources such as subject matter experts and data mining, with design space modeling tools, so that system 100 may perform more thorough searches for potential new technologies than an expert in any one subject matter area might be capable of. Technology tracking system 100 may also search a potentially huge design space that would be infeasible to explore by a manual, unstructured process. Subject matter experts may have deep expertise in a particular area of technology, but it is rare for experts in one area to also maintain expert-level knowledge of new technology developments across a broad array of different technology areas. Extrapolations of technological trends may reveal previously unforeseen modes by which a new technology outside the traditional purview of a given subject matter research community may begin to enable new and disruptive changes to technologies that become newly relevant for that area. Technology tracking system 100 may provide sustainable and scalable data-driven methodologies to discover emerging or disruptive technologies before they have an innovative impact on a selected mission space. Employing such methodologies for systematic new technology prediction may enable more or less continuous scanning of various technology frontiers, and drive technology forecast analysis and reporting to assist a given organization or community of interest in avoiding surprise or disruption by new technologies.

In some illustrative examples, designer engine 102 is configured to use a General Morphological Analysis (GMA) technique, as further described below. Technology tracking system 100 may use a technique such as GMA to identify areas of an engineering design where multiple engineering goals and constraints are in conflict with each other, use a systematized design conflict resolution framework to identify areas of potential resolution of the conflicting design goals and constraints, and compare technology expectations based on technological trends with the identified areas of potential resolution of the conflicting design goals and constraints, to identify design areas where technology may resolve conflicting design goals and constraints. In one example approach, technology tracking system 100 performs the techniques of identifying areas of resolution of design conflicts and of identifying extrapolations from technological trends in different orders or in parallel.

General Morphological Analysis (GMA) is a method for systematically considering all feasible alternatives within a complex decision space. The decision space (or "problem complex") is characterized by N formally orthogonal dimensions, each of which has a small number of possible values or "conditions." The alternative values may be arranged into an N-dimensional matrix, or "morphological box," with each cell corresponding to one combination of engineering design values, each one corresponding to a specific engineering design. The resulting set of formally possible combinations of engineering design values may be referred to as a morphological field or a combinatorial engineering design space.

The morphological field, in practice, can have a vast number of elements. The second step in GMA removes from consideration those points that are infeasible. Infeasibility arises because pairs of values (from two different dimensions) are incompatible, such as due to logical inconsistency or empirical inconsistency. A logical inconsistency occurs when two values directly require that the same aspect of the solution has two distinct conditions. For instance: "part X is made of steel," and "part X is made of wood," are logically inconsistent. An empirical inconsistency occurs when two values indirectly imply conflicting conditions, often requiring some intervening assumptions about the scientific and technological world. For example: "part X is made of metal," and "part X is electrically insulating," might be considered an empirical incompatibility, since the conflict depends on the currently known electrical properties of metals. Notice that advances in metallurgy, metal fabrication, or electrical engineering might, in the future, resolve this conflict. Technology tracking system 100 may focus on identifying and attempting to resolve empirical conflicts between alternative engineering design constraints. For example, technology tracking system 100 may identify technological trends that intersect the conditions or underlying assumptions or properties of conflicting engineering design constraints, and that may result in new morphological cells proximate to the overconstrained morphological cells in the combinatorial engineering design space, in which the conflicting design constraints preventing achievement of a combination of engineering design goals are resolved. Technology tracking system 100 may identify such newly generated subspaces in the combinatorial engineering design space, resulting from the intersection of new technological trends with conflicting engineering design constraints, as areas of potential new designs. GMA is described in further detail in T. Ritchey, *Wicked Problems—Social Messes*, Risk, Governance and Society 17, DOI 10.1007/978-3-642-19653-9_2, #Springer-Verlag Berlin Heidelberg 2011.

Figures 4A, 4B:
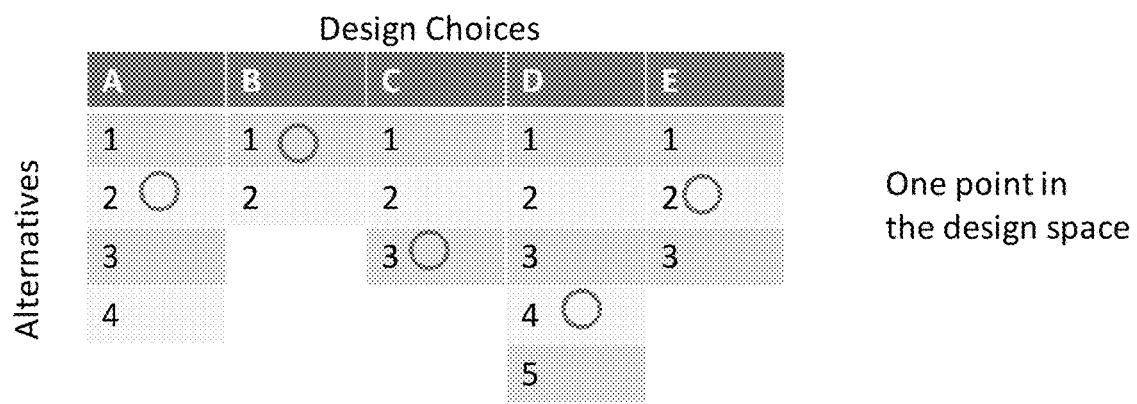
FIGS. 4A and 4B are conceptual diagrams illustrating an example of conflict analysis within a morphological field, in accordance with aspects of the present disclosure.

FIGS. 4A and 4B are conceptual diagrams illustrating an example of conflict analysis within a morphological field, in accordance with aspects of the present disclosure. As can be seen in FIG. 4A, the design space includes five design parameters (A, B, C, D and E), with the number of design choices for each parameter ranging from two to five. A check is made at FIG. 4B to determine if each pair of alternatives are either compatible or are in conflict. For N alternatives, there are O(N²) pairs to check. In the example shown in FIG. 4B, conflicts are marked with an "X".

As noted above, one example implementation of model conflict resolution engine 104 uses techniques based on a TRIZ framework. As noted above, the TRIZ framework provides a systematic method of resolving conflicts in engineering design, such as "maintain parameter X while altering parameter Y," where these two requirements seem to be at odds with one another. In one example approach, the TRIZ techniques identifies 40 general engineering design principles that are each variously indicated as potential areas for design resolutions of conflicts between 39 distinct engineering design parameters that may govern goals and constraints of an engineering design. Thus, every possible pair of the 39 engineering design parameters (the "X" and "Y" of the above template) that may be in conflict, with one of the parameters describing a design goal and the other parameter in the pair describing a corresponding engineering design constraint restraining achievement of the design goal, may be arranged two-dimensionally in a 39-by-39 table, referred to as a design conflict matrix, and with zero or more of the 40 areas of potential design resolution in each of the intersections in the table, indicating potential ways of resolving the design conflict represented in each cell of the table, corresponding to each possible combination of goal-constraint conflict between pairs of the 39 design parameters, as further described below.

FIG. 5 is a conceptual diagram illustrating conflict resolution via TRIZ using a small subsection of a TRIZ conflict matrix 400, in accordance with aspects of the present disclosure. In general, innovations must overcome a conflict between pairs of system aspects or features that are linked—that is, where improving one feature makes the other worse. The relation between features and principles is summarized in FIG. 5. As can be seen in FIG. 5, a conflict between weight and length can be resolved by either "P15: Dynamics" or "P8: Anti-weight" while a conflict between weight and speed can be resolved using "P2: Taking out".

In one example approach, "P15: Dynamics" includes three design principles that, if applied, may resolve the conflict:
  A. Allow (or design) the characteristics of an object, external environment, or process to change to be optimal or to find an optimal operating condition.
  B. Divide an object into parts capable of movement relative to each other.
  C. If an object (or process) is rigid or inflexible, make it movable or adaptive.
Then, for each inventive principle, determine the characteristics of the trend or trends we seek. For instance,
  P15(A): Trend which enables an optimal trade-off for that part between length and weight.
  P15(B): Trend which enables the part in question to be divided into sub-parts:
  P15(C): Trend which enables the part to be flexible or moveable.

In one example approach, model conflict resolution engine 104 applies a TRIZ framework to characterize the forms of resolution that are possible for conflicts that cause infeasibility at points in a morphological field based on extrapolations from known technological trends and expert subject matter updates. In one such example approach, model conflict resolution engine 104 also applies the TRIZ framework to identify intersections of predicted new enabling technologies with indicated areas for how to resolve long-standing conflicts between design goals and constraints and to discover and predict significant and hard-to-predict new technologies that may become enabled in surprising ways by combinations or extrapolations of better-understood predictions of future enabling technologies.

The combination of designer engine 102 and model conflict resolution engine 104 operating on technological trend data may thus generate interesting, and even surprising, new technology predictions. Technology tracking system 100 therefore bridges the gap between abstract principles of areas of resolution of conflicting design goals and constraints and the concrete resolution of conflicts between engineering design goals and constraints that make some approaches infeasible.

The particular examples of designer engine 102 using GMA analysis and design conflict resolution engine 104 implementing a TRIZ framework are illustrative only. Other implementations of technology tracking system 100 may use any of a wide variety of other techniques for engineering design space analysis and engineering design conflict resolution, including techniques specialized for particular subject matter areas.

Technology tracking system 100 may be applied to areas of technology such as computer security, information management, computer networks, and aviation systems engineering, for example. The particular example engineering design goal and constraint resolution framework of the TRIZ framework is generally focused on mechanical engineering fields, and electrical engineering to a lesser extent. Other, analogous engineering design goal and constraint resolution frameworks may be used to address other areas focused on engineering design goal and constraint resolution in areas such as electronics engineering, software engineering, and life sciences (e.g., genetic engineering, medicine, and biotechnology). Technology tracking system 100 may also be applied to analyze and predict future new technologies in industries that are exposed to disruption by new technology and that tend to be risk-averse, such as financial services, power generation, and package delivery, for example. In software engineering focused applications such as computer and network security, technology tracking system 100 may apply software-specific principles of resolution between different engineering design goals and constraints, such as adding an extra level of indirection, lazy versus eager evaluation, and partial evaluation, for example.

Technology tracking system 100 may generate new technology predictions that may be qualitative and/or quantitative. For example, Technology tracking system 100 may generate a new technology prediction involving advances in achieving multiple design goals in Unmanned Aerial Vehicles (UAVs) as parameters affecting design constraints on UAVs are improved, such as power density per weight in batteries. Technology tracking system 100 may qualitatively indicate that certain currently impossible or infeasible design goals of UAVs may become possible after power density per weight in batteries passes certain predicted thresholds in an extrapolation of the parameter of power density per weight in batteries from identified progress of the existing trend in battery technology. Technology tracking system 100 may also generate specific quantitative design parameters, such as relations governing payload weight capacity and airborne flight duration of a UAV given a predicted or extrapolated future value for battery power density per weight. Technology tracking system 100 may also apply physics data or a physics modeling engine to predict hard stopping points to extrapolations of technological trends due to ultimate constraints of physics, such as hard limits on how small an electronic transistor can be made or how high power density per weight of a battery can be made.

Technology tracking system 100 may include a core analysis engine, and data structures and algorithms. Technology tracking system 100 may automate the matching between technological trend endpoints and innovation specifications generated by TRIZ. Technology tracking system 100 may become increasingly useful at larger scales, where manual analysis of possible intersections of technological trends is impractical.

Technology tracking system 100 may generate outputs in the form of prose text descriptions of potential new designs. Technology tracking system 100 may fill in a combination of templates with generated natural language text descriptions of the predicted new technologies. The text outputs generated by Technology tracking system 100 may include an explanation of a given point, set of points, or subspace in the combinatorial engineering design space that correspond to the properties of the predicted new technology; the nature of the conflicts between engineering design goals and constraints that make the predicted new technology infeasible, prior to the fulfillment of the extrapolation of the identified one or more technological trends or changes that enable the predicted new technology; and how those conflicts between engineering design goals and constraints are predicted to be resolved by the identified one or more technological trends or changes. Technology tracking system 100 may generate text descriptions by filling in natural language templates with short phrases that are attached to the design alternatives, and to the technological trends and their endpoints. Technology tracking system 100 may include data structures to drive the selection of templates and to supply text description details to be populated into the templates. In other examples, Technology tracking system 100 may generate outputs indicative of predicted new technologies that may include any of various other forms, such as images, diagrams, flowcharts or graphical models, instruction sets, executable program code, pseudocode, computer-aided design (CAD) files, genetic sequences, protein structures, or protein folding sequences, for example.

In some example approaches, a system 100 of this disclosure may perform operations in various different orders. For example, technology tracking system 100 may first perform a search of engineering design constraints that conflict with engineering design goals for a selected technology area, and then subsequently search among extrapolations of technological trends for technology extrapolations that may address or resolve the previously identified conflicts between engineering design constraints and goals. A system of this disclosure may implement any of various other orders of operations, in other examples.

Figure 6A:
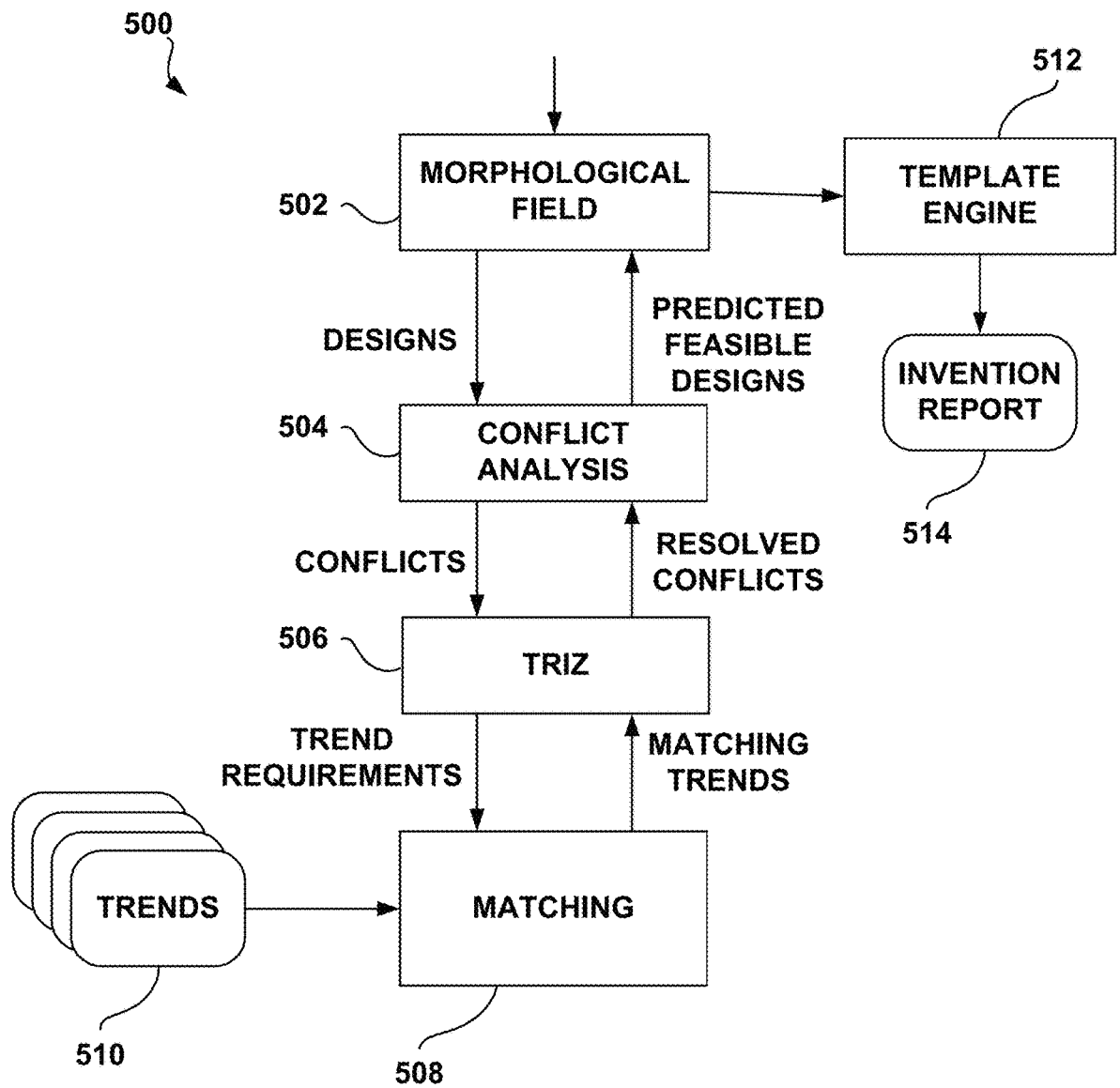
FIGS. 6A and 6B are conceptual diagrams illustrating example workflows in the technology tracking system of FIGS. 2A-2D, in accordance with aspects of the present disclosure.
Figure 6B:
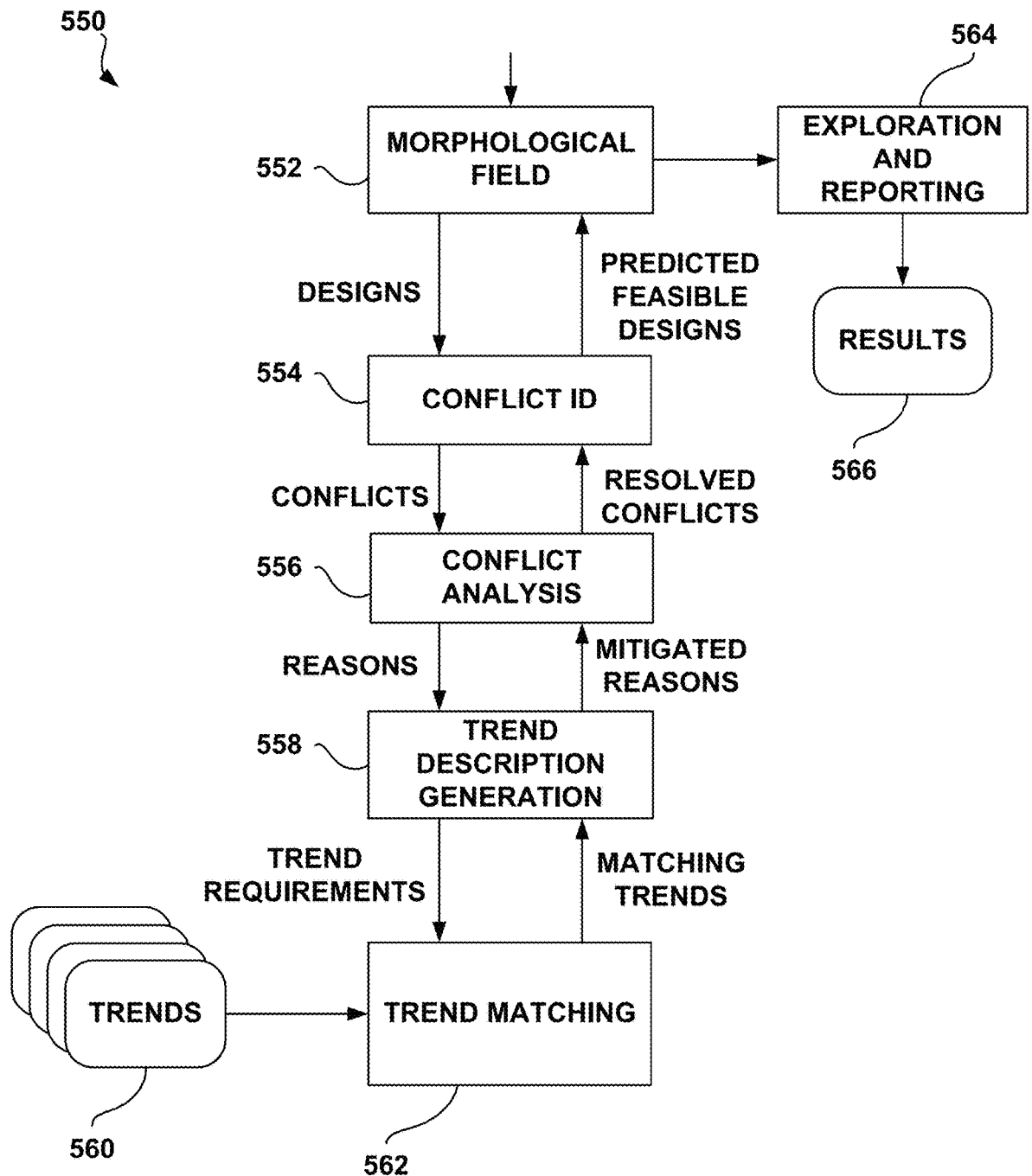

FIGS. 6A and 6B are conceptual diagrams illustrating example workflows (500 and 550, respectively) in the technology tracking system 100 of FIGS. 2A-2D, in accordance with aspects of the present disclosure. In the example shown in FIG. 6A, designer engine 102 establishes a morphological model of the design space (502) that defines feasible and infeasible designs within the design space. At the same time, technological trend information developed by SMEs or via, for example, machine learning are stored (510). The trend information may be developed based on SME knowledge, may be developed based on computerized trend analysis or may be established via a combination of both. In some example approaches, trend analysis includes computer searching of company publications and university and professional technical papers. In some example approaches, trend analysis includes machine analysis of Internet sites and technical databases.

In one example approach, conflict analysis detects conflicts (i.e., infeasible designs) and applies a TRIZ framework to resolve the conflicts (506) based on trend matching (508). The result is a list of predictably feasible designs (512) used to generate an invention report as discussed above.

In the example shown in FIG. 6B, designer engine 102 establishes a morphological model of the design space (552) that defines feasible and infeasible designs within the design space. In one example approach, designer engine 102 begins with the construction of a morphological field, a design space encompassing a wide range of possible solutions to the target problem, some of which will be infeasible. The morphological field may, for instance, take the compact form of a morphological chart.

In one example approach, conflict identification, at 554, finds designs within the morphological model that are infeasible while conflict analysis, at 556, captures the reasons the designs are not feasible. In trend description generation, at 558, zero or more descriptions of plausible technological trends are created for each reason identified at 556. In one such example approach, the plausible technological trends created include descriptions of directions of technical work such that, if this work were successfully undertaken, the reason for conflict would be addressed. Generation of such trend descriptions may require some imagination, because the technical work described does not necessarily correspond to actual, current research and development.

In one example approach, trend matching, at 562, may receive trend requirement descriptions generated as part of trend description generation, at 558, and may compare the trend requirement descriptions received to descriptions of trends recorded as trends 560. In one such example approach, trend requirement descriptions may be compared with trend analysis taken from actual technology research and development to see if the endpoint of the trend is in the near future, as explained above. In one example approach, trends detected at 560 are matched against trend requirements identified at 558 to identify detected trends that match one or more of the trend requirements.

In some example approaches, one or more of the techniques detailed in FIGS. 6A and 6B are carried out by the analyst or SME via a user interface such as user interface 108 of FIG. 2D. In one such example approach, user interface 108 prompts, elicits, and records the analyst's knowledge of the target domain, in a manner that will enable further analysis and prediction.

In one example approach, trend matching is carried out by SMEs, using resources external to technology tracking system 100. In one such example approach, system 100 includes machine learning techniques for partially or fully automating Trend Matching via artificial intelligence techniques.

As can be seen in FIG. 6B, in some example approaches, the second part of the technique may follow the workflow of FIG. 6B, but in the reverse direction. In one example approach, as is shown in FIG. 6B, matching trends lead to mitigated reasons, which lead to resolved conflicts, and then to predicted feasible designs. At the end of the process, one or more of the designs identified as infeasible may be predicted to become feasible due to specific trends identified by the user, by an SME, or via machine learning.

In one example approach, user interface 108 includes program code that supports an interactive exploration of the morphological field, including infeasible, predicted feasible, and currently feasible designs. In one such example approach, the exploration takes the form of a what-if analysis, where the user makes a number of selections, and then system 100 displays the remaining design freedom color-coded to indicate the status of each choice. In some such example approaches, system 100 displays an exploratory list of the morphological chart combinations that remain either feasible, or that are predictably feasible, with colors indicating choices that partake of specific resolved conflicts. Such lists can be long, but may be made shorter when the user selects (and fixes) more aspects of the design.

In one example approach, system 100 performs the bookkeeping needed to track the effect of matching trends through to predicted feasibility. In some example approaches, visual indications of the status of each of the process elements in FIGS. 6A and 6B are displayed via user interface 108.

FIG. 7 is a conceptual diagram illustrating an example matrix 600 of a systematic framework for evaluating areas of resolution of conflicting design goals in an engineering design model, based on a TRIZ framework, in accordance with aspects of the present disclosure. As shown in FIG. 7, the vertical axis of the matrix 600 lists 39 different properties to be improved in the context of an engineering design goal in an engineering design modification, while the horizontal axis lists the same 39 properties in the context of how they might be negatively impacted in the context of the engineering design goals by the improvement in the properties in the vertical axis. The cells of the matrix identify numbers of a list of 40 areas of potential resolution of the conflicting design goals of each point of intersection between the areas to be improved from the vertical axis and the negatively impacted areas of the horizontal axis, according to the following list:

TRIZ Solution Principles: (List 1)
1. Segmentation: Divide an object into separate parts
2. Taking out: separate desired and non-desired parts or properties
3. Local quality: make an object or environment non-uniform
4. Asymmetry: Use an asymmetrical shape
5. Merging: Bring closer together (or merge) identical or similar objects, assemble identical or similar parts to perform parallel operations
6. Universality: Make a part or object perform multiple functions; eliminate the need for other parts
7. Embedded structures
8. Anti-weight: add lift or buoyancy
9. Preliminary anti-action to counter harmful side effects of otherwise useful effects
10. Preliminary action
11. Preliminary compensation
12. Equipotentiality
13. Inversion
14. Spheroidality and curvature
15. Dynamics
16. Excessive action or partial action
17. Another dimension
18. Resonant vibrations
19. Periodical action
20. Continuity of useful action
21. Skipping or short-term action
22. Convert harm to benefit
23. Feedback
24. Intermediary
25. Self-service
26. Copying or imaging
27. Cheap, disposable parts
28. Substitution between mechanical, electrical, optical, acoustic systems
29. Pneumatics and hydraulics
30. Flexible shells and films
31. Porous materials
32. Color changes
33. Homogeneity
34. Discarding and recovering
35. Changing phase or parameters
36. Phase transitions
37. Thermal expansion and contraction
38. Oxidizing material
39. Inert material
40. Composite material Thus, for example, matrix cell 602 at row 3 and column 1 in FIG. 7 is indicative of an engineering design goal of improving the length of a moving object (property no. 3), under the engineering design constraint of maintaining the weight of the moving object (property no. 1). Matrix cell 602 indicates possible solutions in principles 8, 15, 29, and 34 from List 1, corresponding to (8) anti-weight, (15) dynamics, (29) pneumatics and hydraulics, and (34) discarding and recovering. Technology tracking system 100 may include these resolution categories as indicated areas for resolving the given design goal and design constraint in an output. Technology tracking system 100 may further include automated techniques for exploring specific design solutions within each of these categories.

The matrix of FIG. 7 thus defines $39^2$ or 1,521 different matrix cells, each matrix cell defining an intersection of an engineering design goal with an engineering design constraint, and with most of the matrix cells listing one or more identified areas of potential resolution from List 1 identified for the given intersection of design goal and constraint.

The example of technology tracking system 100 using the TRIZ framework as in FIG. 7 and List 1 is one illustrative example among a variety of systematic frameworks for addressing and resolving conflicting engineering design constraints and goals that a system of this disclosure may apply in various examples. Technology tracking system 100 may apply specialized systematic frameworks for addressing and resolving conflicting engineering design constraints and goals in specific subject matter areas, such as in software engineering and computer and network security, or in genetic and microbiological engineering and medical science, for example.

In one illustrative example, technology tracking system 100 identifies, at matrix cell 602, one reason a particular design is infeasible. In the example shown, a particular design is infeasible for one or more reasons, including at least because of a conflict (shown in matrix cell 602) between increasing the length of a moving object without suffering the negative consequences of increasing its weight. The elements shown in cell 602 of the matrix refer to four of the TRIZ Solution Principles found in List 1 that are frequently effective in solving such problems. One of the four principles referred to in that cell is (29) "Pneumatics and hydraulics." This prompts the user to consider whether that part (of the overall problem) might be made rigid through inflation, and to describe, within technology tracking system 100, a prospective technology trend in which such moving objects are made rigid by inflation. If technology tracking system 100 also finds that a technology trend matching this description is in evidence, then it predicts that this particular reason for infeasibility of some designs will be resolved.

In another illustrative example, technology tracking system 100 considers a technological trend of steadily increasing power density per weight in batteries; extrapolates that trend to extrapolated future values of battery power density per weight; and analyzes the intersection of the extrapolated future values of battery power density per weight with a combinatorial engineering design space of unmanned aerial vehicles (UAVs), and in particular, searches for intersections with identified engineering design goals for UAVs such as small size, high payload weight capacity, duration of time a UAV may remain airborne, and making a UAV hard to detect. In the example design goal and constraint matrix of FIG. 7 and List 1, technology tracking system 100 may identify design goals with design goal no. 7 of volume of a moving object, design goal no. 10 of strength, design goal no. 19 of use of energy by a moving object, and design goal no. 37 of difficulty of detecting. Technology tracking system 100 may also identify contradicting design constraints in conflict with the identified design goals, and then identify the indicated solution areas from List 1 indicated in the matrix cells of FIG. 7. System 100 may further analyze how to apply the general resolution areas indicated in the matrix of FIG. 7 and in List 1, using extrapolated new technologies generated in light of available technological trends, to specific design modifications that might be applied to specific known designs of UAVs, which may be encoded as Computer Aided Design (CAD) files, for example.

Figure 8:
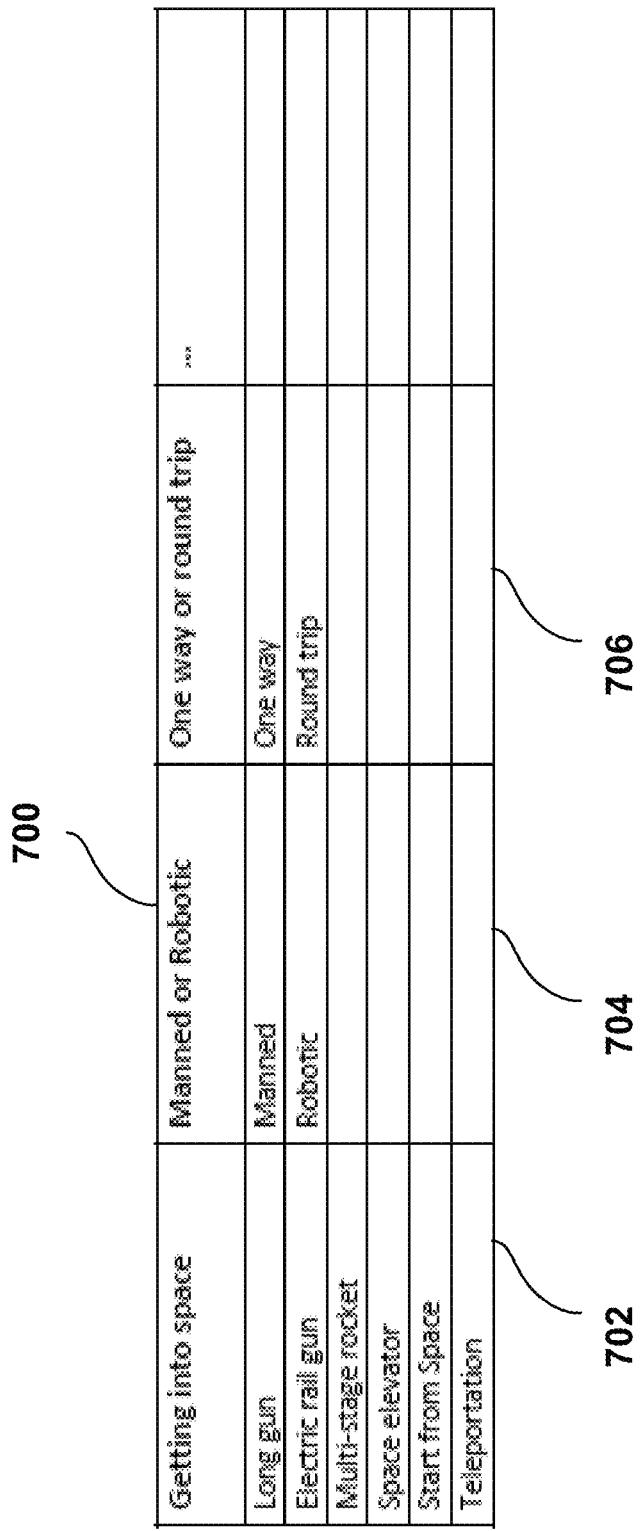
FIG. 8 is a conceptual diagram illustrating one example of technology tracking, in accordance with aspects of the present disclosure.

FIG. 8 illustrates one example of technology tracking, in accordance with aspects of the present disclosure. In the example of FIG. 8, the topic is interplanetary space missions. A morphological chart 700 for the topic interplanetary space missions is shown in FIG. 8. In the morphological chart of FIG. 8, column 702 indicates ways of getting into space, column 704 indicates types of missions and column 706 indicates whether the desired design is to be for a one way trip or a round trip.

Consider the pair of values (Electric rail gun, Manned). That is, the design is for a manned flight launched by electric rail gun. As noted above, rail gun launches of payloads into space are currently considered not feasible due to the muzzle velocity needed to lift the payload into space and the resulting heat faced by the payload (caused by friction as the payload passes through the atmosphere at such a high velocity). There is an additional conflict when using a rail gun to launch humans into space since, in order to reach speeds necessary for even a low-earth orbit, a rail gun would need to apply an acceleration that is currently lethal to humans. (The assumption here is that a rail gun as long as the longest tunnel ever created is feasible. Another assumption is that 10 Gs of acceleration for 10 seconds would be lethal under ordinary circumstances.)

In one example approach, designer engine 102 notes that the combination of a manned flight and an electric rail gun launch is not feasible and the conflict is presented to model conflict resolution engine 104, which applies TRIZ analysis to the conflict. One way to characterize the problem is via a pair of TRIZ parameters:

Parameter to improve: (30) Object-affected, harmful (i.e., the human passenger is harmed); and Parameter to preserve: (10) Force, i.e. the acceleration (G-force).

In one example approach, model conflict resolution engine 104 arrives at the following TRIZ suggested inventive principles: (13) "The other way around"; (35) "Parameter Changes"; (39) "Inert atmosphere"; and (18) "Mechanical Vibration." Consider each of these:

(13) "The other way around", e.g., "Turn the process or object upside down."

Is it possible that humans are more resilient to G-forces in certain orientations? Can we rotate the person continuously so that the G-force does not act in the same direction for long?

(35) "Parameter Changes"

e.g. "Change the degree of flexibility" Can we mitigate harm to humans from G-forces with medications to alter the flexibility of blood vessels?

e.g., "Change the temperature". Would a person be less vulnerable to harm if their body temperature were lower by a large amount?

(39) "Inert atmosphere" e.g. "Add neutral parts or inert additives to object." Could such additives (to a human) mechanically prevent harm from G-forces?

(18) "Mechanical Vibration." Seems counter-productive.

From the above, model conflict resolution engine 104 arrives at a list of trends to explore:

1) Research on greater human resistance to G-forces, particularly, preventing harm via reorienting the acceleration relative to the body, 2) Research on drugs affecting the circulatory system, 3) Research on body additives or modifications to mechanically resist G-forces 4) More generally (and longer-term), look for any advances in human modification (e.g., cyborgs) for enhancement or medical treatment, either physical or genetic, that might ultimately provide resistance to G-force injuries.
5) Also look for any R&D leading to human hibernation and/or torpor.

If resolution engine 104 finds a real technological trend that matches any of these descriptions (with an appropriate predicted level of success and time-frame), then this conflict can be classified as "predicted to be resolved." An analyst may then work backwards to identify overall designs for interplanetary missions that are predicted to be enabled by this trend (possibly in combination with other trends), i.e., missions that are not currently feasible, but are predicted to become feasible (universe 14).

FIG. 8 is a conceptual diagram illustrating an example of technology tracking, in accordance with aspects of the present disclosure. In one example approach, a morphological model of all approaches for launching a payload into space includes one or more designs for a manned flight launched by electric rail gun, as detailed in FIG. 8. As noted above, current designs for manned flight launched via electric rail gun may not be feasible because the acceleration needed to launch a human into may be lethal to a human, for the reasons detailed above.

Applying the workflow of FIG. 6B, in one example approach, a user defines the morphological model, at 552, noting, at 554, that there is a conflict between the acceleration needed to launch the vehicle into space and the safety of the human being launched. This conflict is stored as a conflict pair {acceleration needed to launch vs. human safety at the needed acceleration}. Note that, in this approach, one doesn't have to define the parameter to preserve. One can resolve the conflict by reducing the acceleration needed to levels safe for human launch (e.g., by lengthening the rail gun such that acceleration is reduced), may take steps, as noted above, to protect the human from the effects of high acceleration, or may resolve the conflict via a combination of both approaches. At 556, the user provides the reasons for the conflict (human safety at high acceleration). At 558, system 100 generates one or more descriptions of plausible technological trends for each reason identified at 556. In one such example approach, the plausible technological trends created include descriptions of directions of technical work such that, if this work were successfully undertaken, the reason for conflict would be addressed. Generation of such trend descriptions may require some imagination, because the technical work described does not necessarily correspond to actual, current research and development. Once again, an analysts might identify the following as plausible technological trends for resolving the conflict. In the area of increasing the acceleration a human can sustain, the user may identify the following as plausible trends to review:
1) Research on greater human resistance to G-forces, particularly, preventing harm via reorienting the acceleration relative to the body,
2) Research on drugs affecting the circulatory system,
3) Research on body additives or modifications to mechanically resist G-forces
4) More generally (and longer-term), look for any advances in human modification (e.g., cyborgs) for enhancement or medical treatment, either physical or genetic, that might ultimately provide resistance to G-force injuries.
5) Also look for any R&D leading to human hibernation and/or torpor.

In the area of reducing the acceleration a human will be subjected to on launch, the user may identify the following as plausible trends to review:
1) Reducing the acceleration needed to launch by increasing the length of the rail gun
2) Reducing the acceleration needed by reducing drag on the launch vehicle
3) Moving from linear to nonlinear acceleration Trend matching, at 562, receives the trend requirement descriptions detailed above and compares, at 562, the trend requirement descriptions to trends 560. In one such example approach, trend requirement descriptions may be compared with trend analysis taken from actual technology research and development to see if the endpoint of the trend is in the near future, as explained above. In one example approach, trends detected at 560 are matched against trend requirements identified at 558 to identify detected trends that match one or more of the trend requirements.

In one example approach, trend requirements identified at 558 are forwarded to SMEs for review. In some such example approaches, the SME receiving the trend requirement determines whether the trend will be met by any trends of which the SME is aware. In some cases, the SME may contract with database search providers to search for more information on particular trends. In other cases, the SME may perform their own searches using, for instance, a search engine or a database search.

If a trend 560 matches one or more of the trend requirements, a check is made, at 558, to determine if the matching trends mitigate the reasons for the conflict detailed at 556. If so, the conflict is resolved and the infeasible design becomes a predictably feasible design.

As noted above, one may also take into account the length of time need for a trend to come to fruition. In one example approach, if one is looking for predictably feasible designs in the next five years and a trend is not expected to be realized for fifteen years, the trend is not treated as a matching trend. In another example approach, a trend that is not expected to be realized for fifteen years may be noted as a matching trend at 562 but may be discarded as a trend at 558 due to the time for the trend to be realized.

Figure 9A:
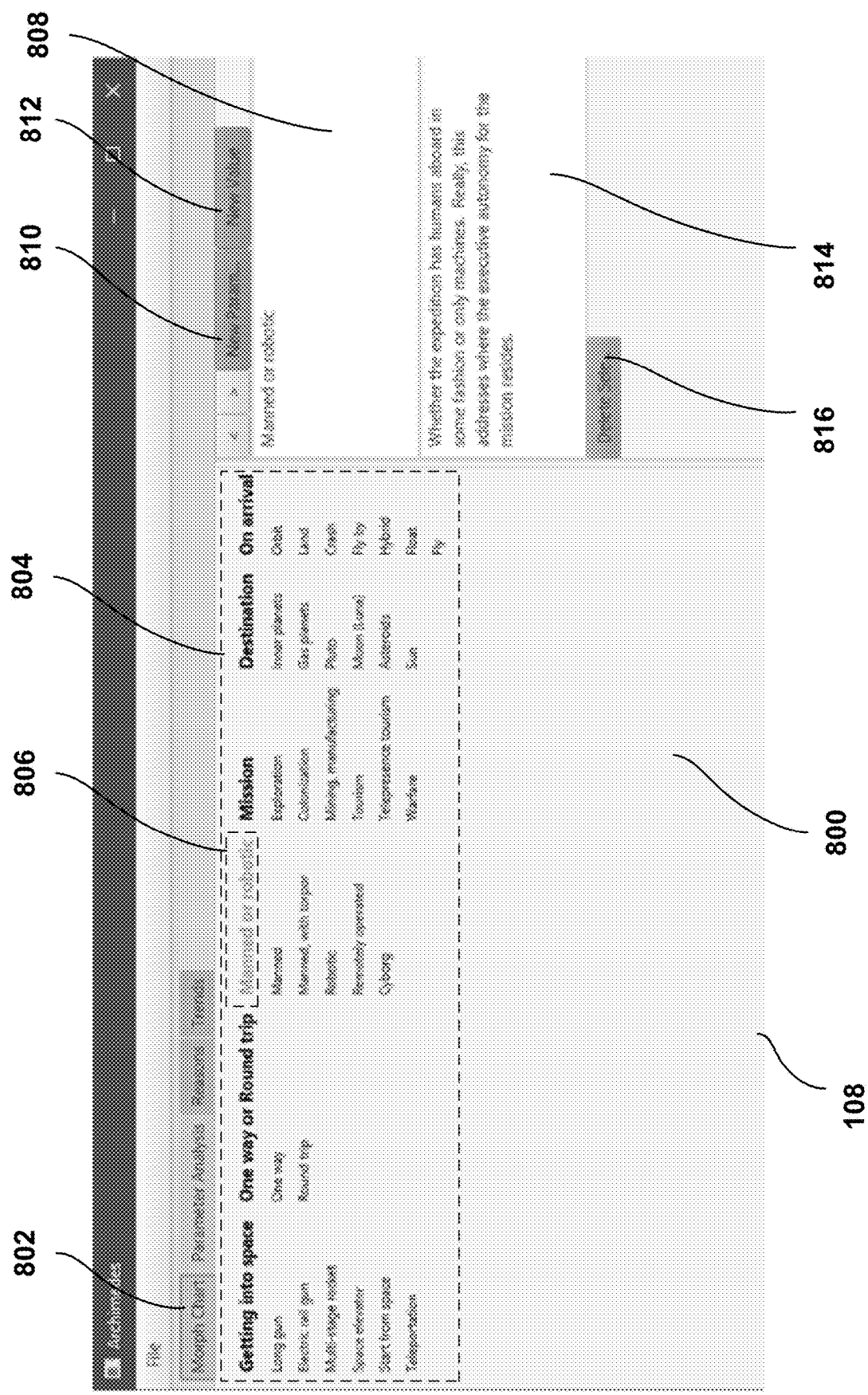
FIGS. 9A-9G are conceptual diagrams illustrating example screen shots in an example user interface used in one approach to morphologically-based feasibility analysis.

FIGS. 9A-9G are conceptual diagrams illustrating example screen shots in an example user interface 108 used in one approach to morphologically-based feasibility prediction. As can be seen in FIG. 9A, when one selects "Morph Chart" 802, a design space 800 is displayed showing a morphological chart 804. The morphological chart 800 includes six design parameters (Getting into space, One way or Round trip, Manned or Robotic, Mission, Destination, and On arrival), with the number of design choices for each parameter ranging from two to seven. The name for each design parameter is placed in the header 806 of each design parameter column and can be revised, in this example, via editing window 808. A new design parameter may be added to morphological chart 804 via button 810, while additional values can be added to a design parameter via button 812. When a new design parameter is added, one may, in some example approaches, add a description of the design parameter via definition window 814. In one example approach, a design parameter may be deleted by selecting the header 806 of the design parameter and selecting button 816. In a similar manner, a design parameter value may be deleted by selecting the value listed under the appropriate design parameter header 806 and selecting a button.

Figure 9B:
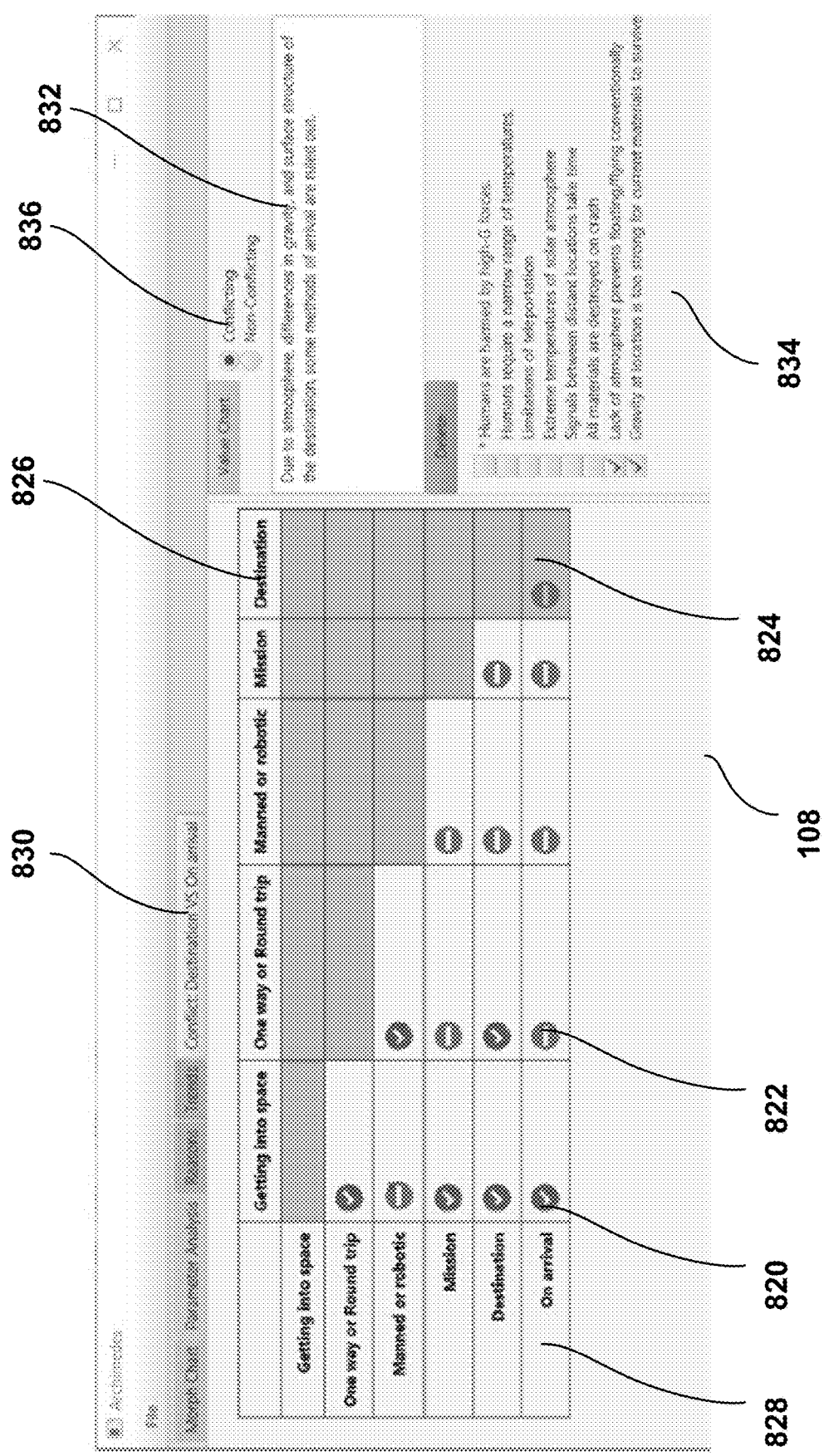

FIG. 9B is a conceptual diagram illustrating a method of displaying the existence of conflicts between design parameters. A check mark 820 indicates no conflicts exist between any of the values of the two design parameters while a minus sign 822 indicates that at least one conflict exists between values of the two design parameters. In the example approach of FIG. 9B, if one selects the intersection 824 of Destination 826 and On arrival 828, a tabbed window 830 opens under the tab "Conflict: Destination VS On arrival." In one such example approach, user interface 108 also displays whether a conflict exists for a particular pair of design parameters and provides the reasons for the conflict(s) in a note within window 832 and in a checklist 834. In one such example approach, the user may add or delete reasons for the conflict as desired. A user may, for example, indicate, via selector 836, whether a conflict exists before providing the reasons for the conflict in a note within window 832 and in a checklist 834. As noted above, the reasons for the conflicts are important in discovering trends that resolve existing conflicts and should be documented as fully as possible in window 832 and checklist 834.

Figure 9C:
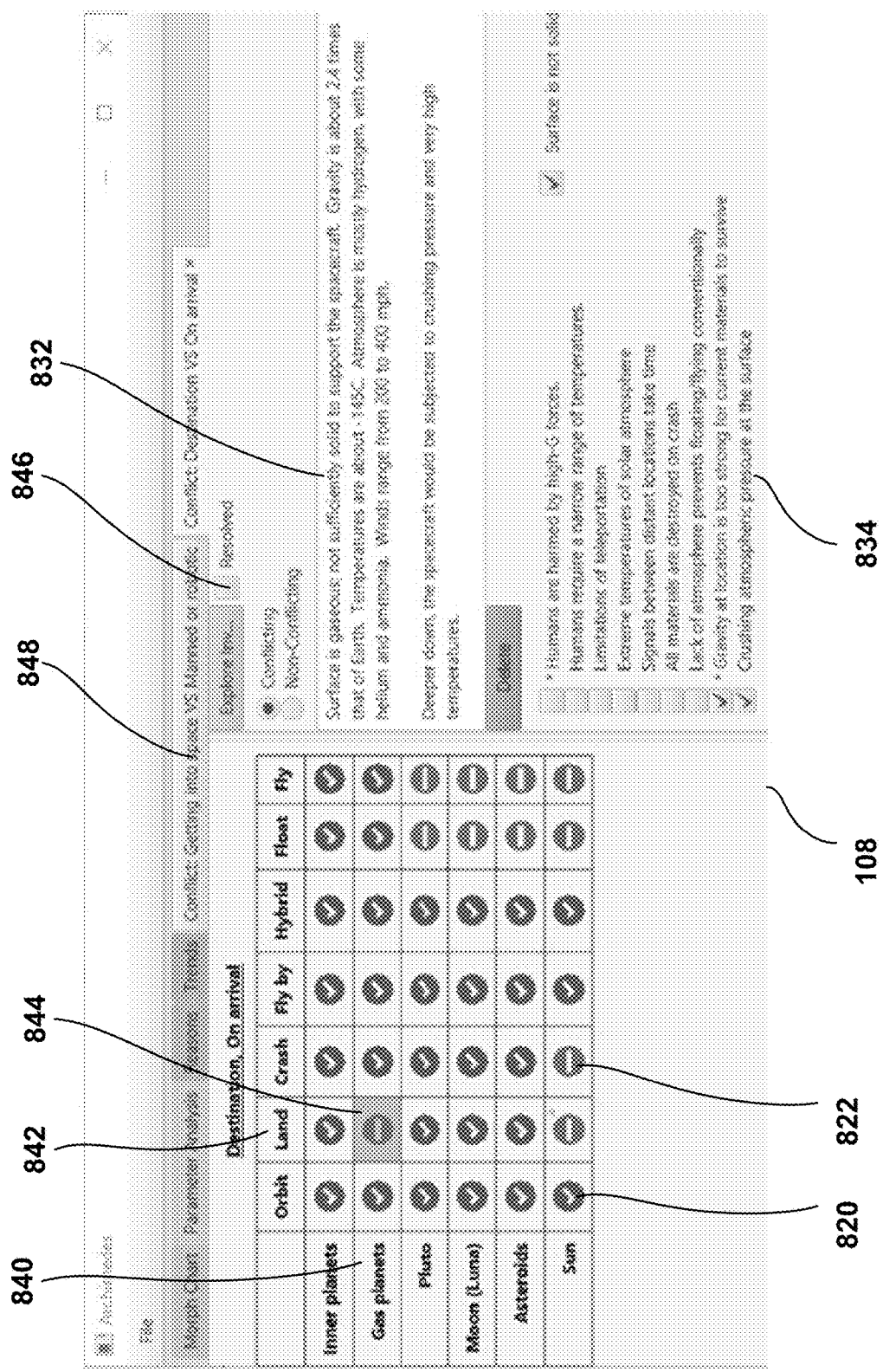

FIG. 9C is a conceptual diagram illustrating one example approach for displaying the tabbed window 830 of FIG. 9B. In the example shown in FIG. 9C, a check mark 820 indicates no conflicts exist between the indicated values of the two design parameters while a minus sign 822 indicates that a conflict exists between the indicated values of the two design parameters. In the example approach of FIG. 9C, a conflict exists between the Destination value 840 of "Gas Planet" and the On arrival value 842 of "Land." Checklist 834 is a listing of all reasons design parameter pairs conflict. If one selects the intersection 844 of the Destination value 840 of "Gas Planet" and the On arrival value 842 of "Land," reasons for the conflict between that specific design parameter pair are checked off on checklist 834 and detailed in greater detail in window 832. If a trend or combination of trends mitigate the listed reasons, the combination of the Destination value 840 of "Gas Planet" and the On arrival value 842 of "Land" becomes a predictably feasible design pairing. In one example approach, a user may select checkbox 846 to determine the designs that become feasible if all the reasons for the conflict at 844 are mitigated or resolved by technological trends.

As can be seen in the example approach of FIG. 9C, the user appears to have selected the intersection 824 of design parameters "On arrival" and "Destination," causing the display of a tabbed window 848 for exploring that conflict as shown in FIG. 9C. Analysis of this conflict may proceed as shown in the discussion of the conflict between Destination 826 and On arrival 828 above.

Figure 9D:
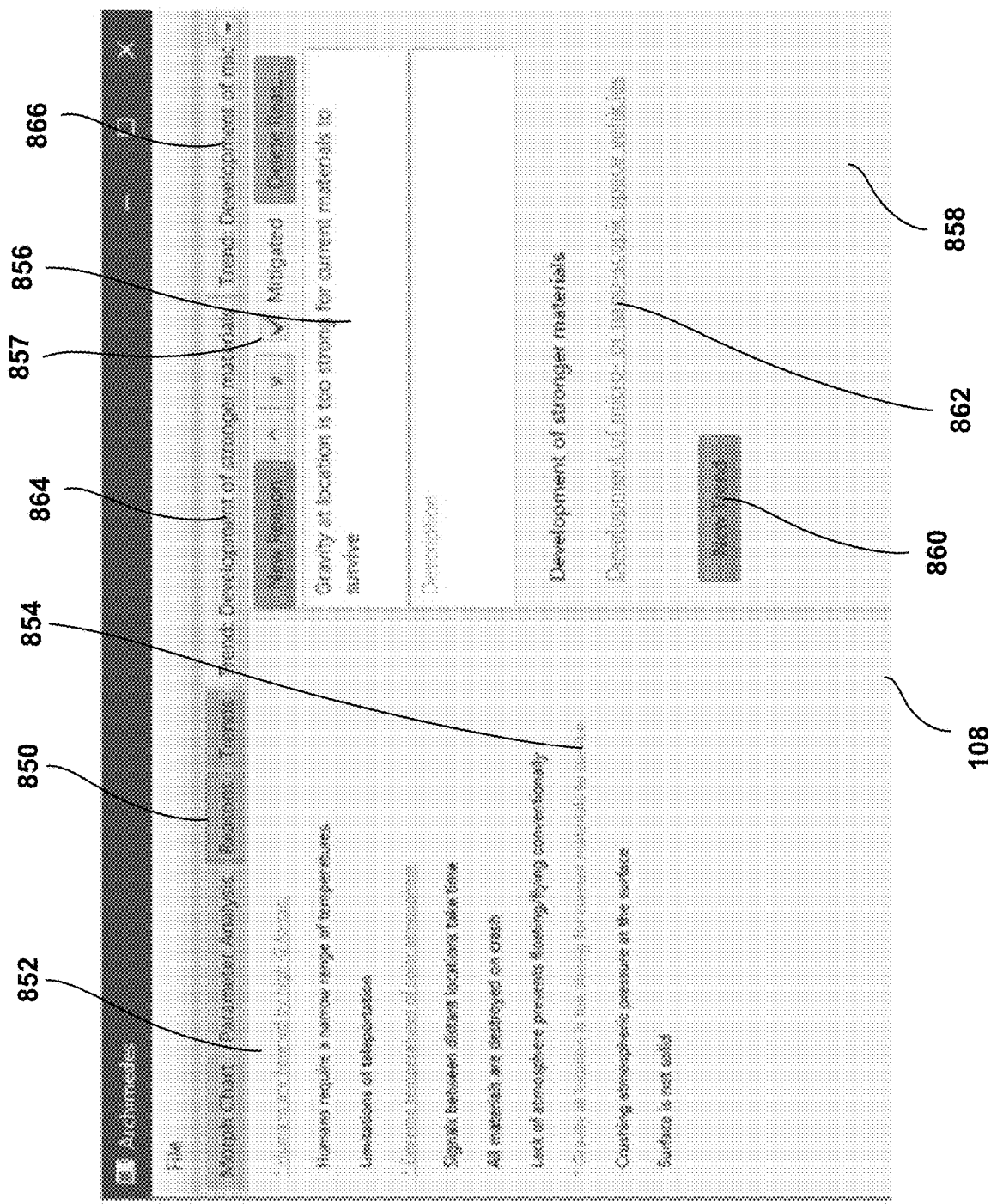

FIG. 9D is a conceptual diagram illustrating one example approach for formulating trend requirements in response to the statement of reasons for a conflict between a particular value of one design parameter and a particular value of a second design parameter. As can be seen in FIG. 9C, when one selects "Reasons" tab 850 in the screenshot of FIG. 9C, system 100 lists, in list 852 all the reasons that design parameter pairs are in conflict. List 852 should match checklist 834 in FIG. 9C. In one example approach, a user edits reasons listed in list 852 by clicking on the reason and editing the description in window 856. For instance, one of the reasons listed for a conflict in design parameter pairs is that "Gravity at location is too strong for current materials to survive," as noted at reason 854 in the list of reasons 852. In the example approach shown in FIG. 9D, by clicking on the reason "Gravity at location is too strong for current materials to survive" in the list of reasons 850, a window 856 opens listing the reason and a trend requirements section 858 opens allowing a user to define trends that may mitigate that reason. In the example shown, the development of micro- or nano-scopic space vehicles at 862 is shown as a trend that could mitigate the reason. The user is also given a button 860 for defining other trends that would mitigate the reason "Gravity at location is too strong for current materials to survive" in the list of reasons 850. In addition, tabbed windows may be used (e.g., trend tab 864 and trend tab 866) to record details about each trend.

Figure 9E:
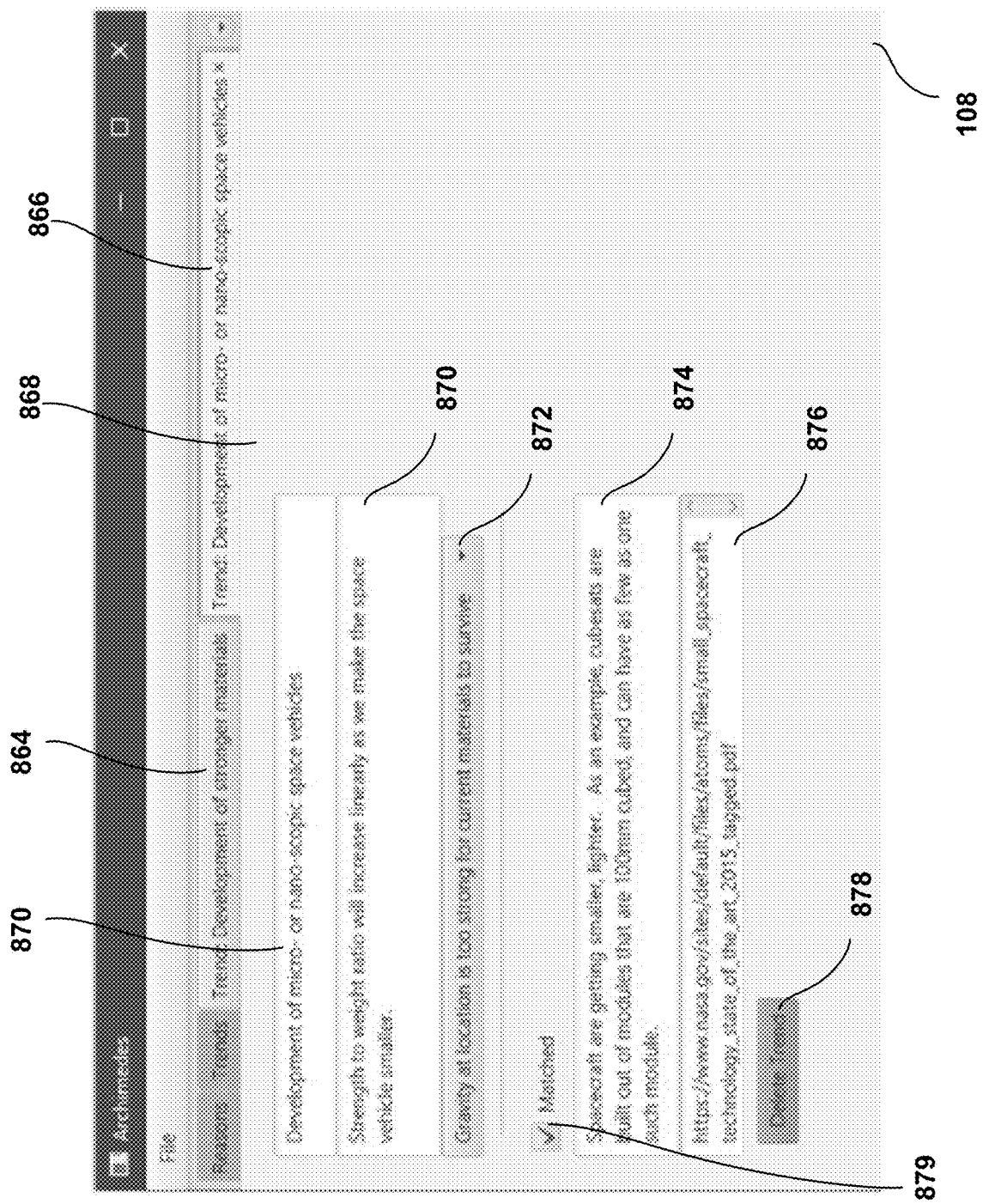

FIG. 9E is a conceptual diagram illustrating one example approach for defining an individual trend. In the example approach of FIG. 9E, tab 866 of FIG. 9D has been selected and a new window 868 has opened. In the example of FIG. 9E, the trend being reviewed is "Development of micro- and nano-scopic space vehicles," as shown in trend tab 866 and in trend identifier 870. Window 868 also displays a description box 870 that contains a description of the trend and a selector box 872 that allows the user to associate the trend with one of the reasons that an infeasible model design is not feasible.

In the example approach shown in FIG. 9E, disclosure evidencing progress in the technological trend, if any, is recorded in window 874, while cites supporting the evidence are shown in window 876. In addition, a "Delete Trend" button 878 is provided in order to allow the user to delete a technological trend.

In the example shown in FIG. 9E, the "Matched" box 879 records the user's judgement that the actual trend found really does meet the requirements of the trend described in box 870. For instance, suppose a user performed some research and found related materials (recorded in 874 and 876) but the disclosure is not sufficient to overcome the conflict. On the other hand, there may actually be a trend heading in the right direction, but it may be happening too slowly. For instance, a user may be interested in a five year time horizon but the trend isn't expected to be complete for ten years. Such a trend may be judged to not match, even though the user may have recorded information about the technology for future reference.

In one example approach, if box 879 is checked, as it is in this instance, then in the reasons view 850, the user may see an asterisk next to the reason 854, prompting the user to consider whether this reason is sufficiently addressed by the known matching trends. If there are no matching trends, then there will be no asterisk. The particular trends that are associated with this this reason are shown on the right in 850 (e.g., 862). Notice that trend 862 is underlined, and may be in a different color. In one example approach, that means that trend 862 is a trend that has been matched against actual research and development.

Having judged that the trends in evidence are sufficient, then the user may mark this reason as "mitigated" with check box 857 at the top of 850, as it is in this example. This marking, in turn, affects the view of FIG. 9C tabbed window 848. The asterisk next to "Gravity at location is too strong . . . " indicates that this reason is predicted to be mitigated. Now the user, in view 848, can look at the list of reasons that are checked (there are three) and, of those, the ones that have asterisks, and decide if this conflict should be considered to be resolved (check box 846).

In one example approach, the judgements are all manually recorded, and are defaulted to be "no". In other example approaches, such judgements may be automated, with a manual override. If there is a trend in evidence, for example, then, by default it is "matched" unless overridden. And, if any of the trends associated with a reason is matched, then that reason is defaulted to "mitigated". And so on.

Figure 9F:
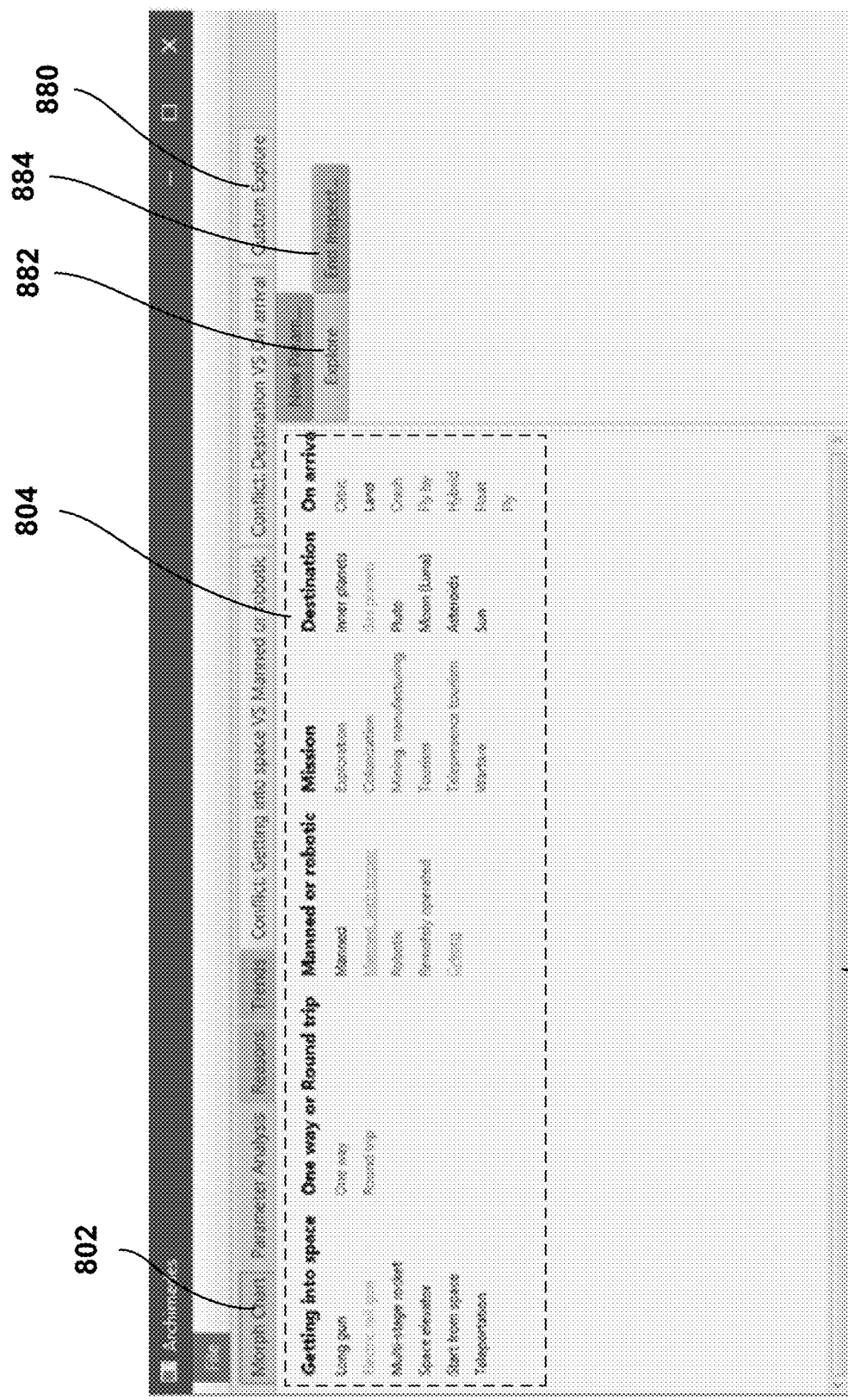

FIG. 9F is a conceptual diagram illustrating one example approach for exploring a design space. As can be seen in FIG. 9F, display 108 may open a tabbed window 880 used to explore combinations of design parameters in morphological chart 804. In one such example approach, tabbed window 880 opens via an "Explore" button 882. In one example approach of FIG. 9F, an "End Inspection" button returns the display to what is shown in FIG. 9A.

In FIG. 9F, zero or more values of parameters may be speculatively selected. The remaining values may, in some approaches, be color-coded to indicate whether they could be selected as part of an over-all feasible design, or, with a different color, as part of an overall design that is predicted to become feasible, that also includes the speculatively selected options.

In one example approach, as illustrated in chart 804 of FIG. 9F, the options Electric rail gun and Gas planets are selected. Other values for the parameters Getting into space and Destination are colored black to indicate that they cannot be selected in this context because the values of a parameter in a Morphological chart are considered to be mutually exclusive. Two other values are marked in this way because they are not feasible and not predicted to become feasible choices. These are "Manned" and "Land".

The remaining values in this chart are either feasible (i.e., could be part of an overall design, including the two selections above, with no conflicts), or are predicted to become feasible (i.e., could be part of an overall design including the two selections above, that does include conflicts, but only ones that are "resolved"). In this black-and-white illustration, these can be distinguished because the latter values are underlined.

Figure 9G:
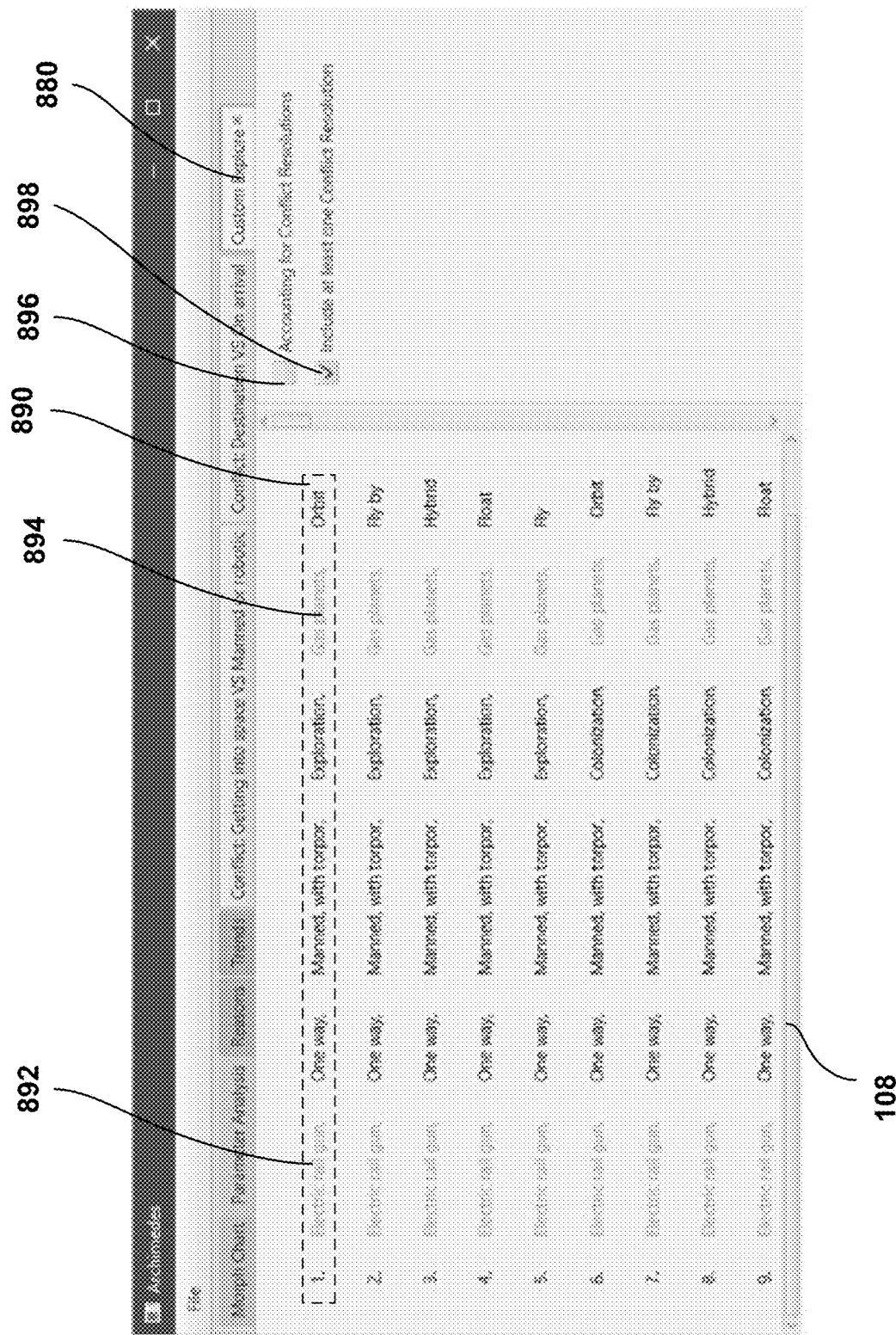

FIG. 9G is a conceptual diagram illustrating one example approach for displaying the selections of FIG. 9F. In the example approach shown in FIG. 9G, tabbed window 880 has opened to display a list of combinations 890 of the six parameters that include the two selected parameters, "Getting into space" parameter "Electric rail gun" 892 and the "Destination" parameter "Gas planets" 894. By default, this list exhaustively lists all combinations of values, including the selections of FIG. 9F, that are free of all conflicts. If the box 896 is checked, then, the list also includes combinations of values that have resolved conflicts. And, if box 898 is checked, as shown in FIG. 9G, then 890 will contain only those combinations of values that contain at least one resolved conflict (but no unresolved conflicts). Note that in this last case, the list elements are just those combinations that are predicted to become feasible.

Figure 10:
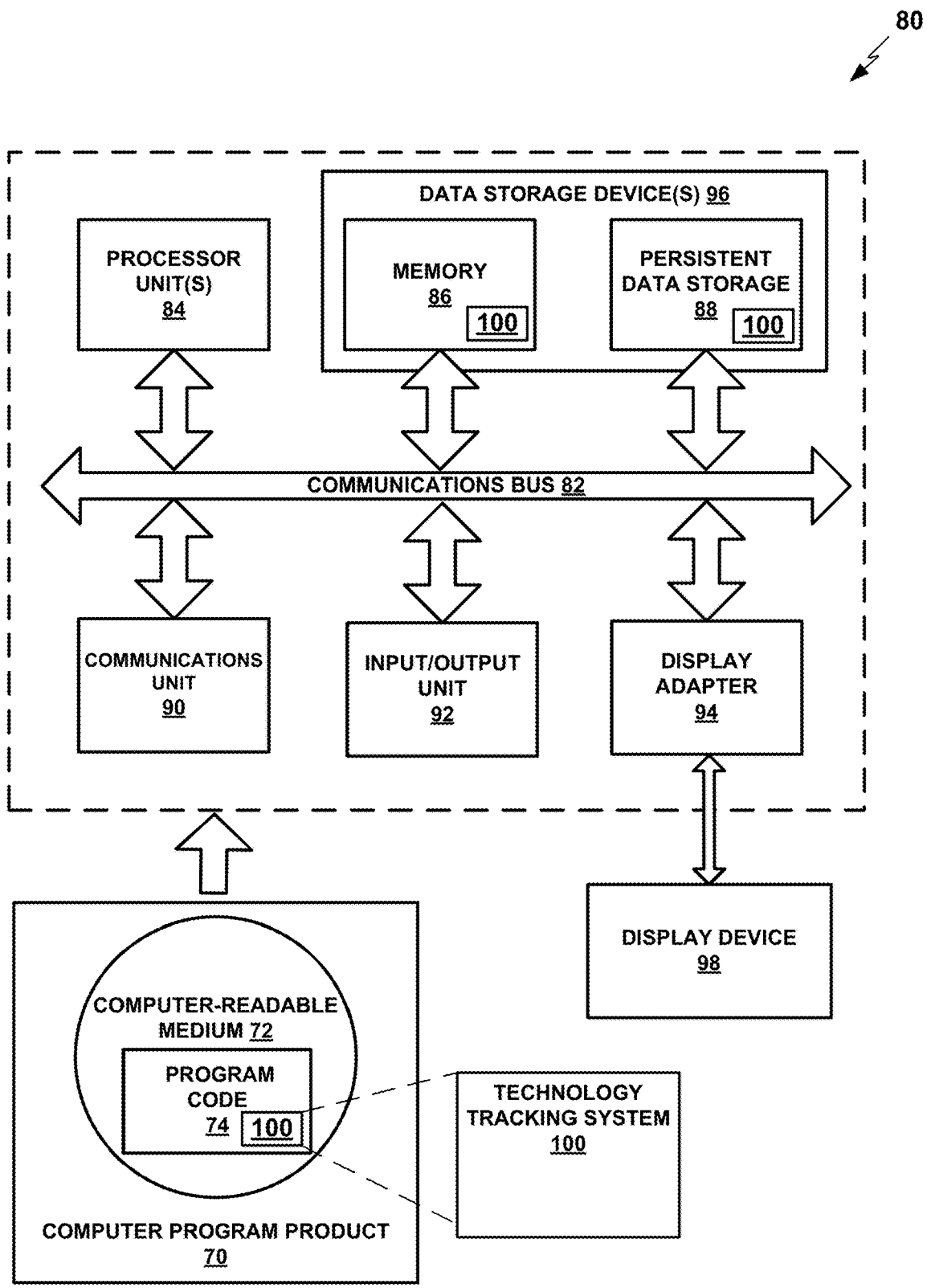
FIG. 10 is a block diagram of an example computing device that may be used to host and/or execute an implementation of a technology tracking system as described above with reference to FIGS. 1-9, in accordance with various aspects of the present disclosure.

FIG. 10 is a block diagram of a computing device 80 that may be used to host and/or execute an implementation of technology tracking system 100 as described above with reference to FIGS. 1-9, in accordance with aspects of the present disclosure. In various examples, technology tracking system 100 hosted and/or executing on computing device 80 may perform at least some of the functions described above. Computing device 80 may be a laptop computer, desktop computer, or any other type of computing device. Computing device 80 may also be a server in various examples, including a virtual server that may be run from or incorporate any number of computing devices. A computing device may operate as all or part of a real or virtual server, and may be or incorporate a specialized air traffic control workstation, other workstation, server, mainframe computer, notebook or laptop computer, desktop computer, tablet, smartphone, feature phone, or other programmable data processing apparatus of any kind. Other implementations of a computing device 80 may include a computer or device having capabilities or formats other than or beyond those described herein.

In the illustrative example of FIG. 10, computing device 80 includes communications bus 82, which provides communications between processor unit 84, memory 86, persistent data storage 88, communications unit 90, and input/output (I/O) unit 92. Communications bus 82 may include a dedicated system bus, a general system bus, multiple buses arranged in hierarchical form, any other type of bus, bus network, switch fabric, or other interconnection technology. Communications bus 82 supports transfer of data, commands, and other information between various subsystems of computing device 80.

Processor 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor, an x86 compatible processor, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage device 96 includes memory 86 and persistent data storage 88, which are in communication with processor unit 84 through communications bus 82. Memory 86 can include a random access semiconductor memory (RAM) for storing application data, e.g., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage mediums. Persistent data storage 88 may store computer-executable instructions or computer-readable program code for an operating system, application files including program code, data structures or data files, and any other type of data. These computer-executable instructions may be loaded from persistent data storage 88 into memory 86 to be read and executed by processor unit 84 or other processors. Data storage device 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical computer-readable data storage devices. Data storage device 96 may include any of various forms of volatile memory that may require being periodically electrically refreshed to maintain data in memory, while those skilled in the art will recognize that this also constitutes an example of a physical computer-readable data storage device. Executable instructions may be stored on a physical medium when program code is loaded, stored, relayed, buffered, or cached on a physical medium or device, including if only for only a short duration or only in a volatile memory format.

Processor unit 84 can also be suitably programmed to read, load, and execute computer-executable instructions or computer-readable program code for a technology tracking system 100, as described in greater detail above. This program code may be stored on memory 86, persistent data storage 88, or elsewhere in computing device 80. This program code may also take the form of program code 74 stored on computer-readable medium 72 included in computer program product 70, and may be transferred or communicated, through any of a variety of local or remote means, from computer program product 70 to computing device 80 to be enabled to be executed by processor unit 84, as further explained below. Computer program product 70 may be a computer program storage device in some examples.

The operating system may provide functions such as device interface management, memory management, and multiple task management. The operating system can be a Unix based operating system, a non-Unix based operating system, a network operating system, a real-time operating system (RTOS), or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage device 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 70, which includes a computer-readable medium 72 having computer program code 74 stored thereon. For example, computer program product 70 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 72 may include any type of optical, magnetic, or other physical medium that physically encodes program code 74 as a binary series of different physical states in each unit of memory that, when read by computing device 80, induces a physical signal that is read by processor 84 that corresponds to the physical states of the basic data storage elements of storage medium 72, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 74.

In some illustrative examples, program code 74 may be downloaded over a network to data storage device 96 from another device or computer system for use within computing device 80. Program code 74 including computer-executable instructions may be communicated or transferred to computing device 80 from computer-readable medium 72 through a hardline or wireless communications link to communications unit 90 and/or through a connection to input/output unit 92. Computer-readable medium 72 comprising program code 74 may be located at a separate or remote location from computing device 80, and may be located anywhere, including at any remote geographical location anywhere in the world, and may relay program code 74 to computing device 80 over any type of one or more communication links, such as the Internet and/or other packet data networks. The program code 74 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 74 may be transmitted from a source computer-readable medium 72 over mediums, such as communications links or wireless transmissions containing the program code 74. Program code 74 may be more or less temporarily or durably stored on any number of intermediate physical computer-readable devices and mediums, such as any number of physical buffers, caches, main memory, or data storage components of servers, gateways, network nodes, mobility management entities, or other network assets, enroute from its original source medium to computing device 80.

The techniques described above help organizations avoid future technological risk by predicting non-obvious inventions that may become feasible due to technology evolution. Organizations benefit because the techniques combine the technological trend information from narrowly focused sources such as subject matter experts and data mining into general trend information. The analysis combines trends across disparate fields, systematically so that the search for relevant inventions is thorough. In addition, automation enables searching a potentially huge design space that would be impractical to explore by a manual, unstructured process.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processing units (e.g., processors) to retrieve instructions, code and/or data structures for implementation of the techniques described in this disclosure. A computer program product may include a computer-readable medium.

By way of example, and not limitation, such computer-readable storage media can comprise random access memory (RAM), read-only memory (ROM), electrically erasable programmable read-only memory (EEPROM), compact disc read-only memory (CD-ROM) or other optical disk storage, magnetic disk storage, or other magnetic storage devices, flash memory, or any other storage medium that can be used to store desired program code in the form of instructions or data structures and that can be accessed by a computer. Also, any connection may properly be termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, which may reproduce data magnetically, or optically, e.g., readable using a laser. Combinations of the above should also be included within the scope of computer-readable media.

Instructions may be executed by one or more processing units (e.g., processors), such as one or more digital signal processors (DSPs), general purpose microprocessors, application specific integrated circuits (ASICs), field programmable logic arrays (FPGAs), or other equivalent integrated or discrete logic circuitry. Accordingly, the term "processing unit" or "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set or a system on a chip (SoC)). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processing units as described above, in conjunction with suitable software and/or firmware.

Depending on the embodiment, certain acts or events of any of the methods described herein may be performed in a different sequence, or may be added, merged, or left out altogether (e.g., not all described acts or events are necessary for the practice of the method). Moreover, in certain embodiments, acts or events may be performed concurrently, e.g., through multi-threaded processing, interrupt processing, parallel processing or otherwise with multiple processing units, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that may change over time (e.g., in RAM or cache), even on short time scales, yet is at least temporarily physically (e.g., magnetically, electrically, optically) embodied in a physical data storage or memory structure, and thus is distinguished from a transitory medium.

Various examples have been described. These and other examples are within the scope of the following claims.

What is claimed is:

1. A system comprising:
one or more processors; and
one or more memory components operably coupled to the one or more processors,
wherein the one or more processors are configured to:
define, in one or more of the memory components, a plurality of model designs;
determine that the plurality of model designs includes a plurality of infeasible model designs associated with engineering design goals, including identifying reasons why the infeasible model designs associated with the engineering design goals are not currently technologically feasible due to limits in current technology, wherein the plurality of infeasible model designs incorporate conflicting design choice pairs, and wherein the conflicting design choice pairs include pairs of design choices that conflict with one another that make the engineering design goals infeasible;

receive a plurality of trend descriptors associated with technological trends;

store, in one or more of the memory components, information representing the technological trends and the plurality of trend descriptors;

in response to determining the plurality of infeasible model designs, determine, based at least in part on one or more of the plurality of trend descriptors, one or more of the technological trends that potentially mitigates one or more of the conflicting design choice pairs associated with one or more of the infeasible model designs;

in response to determining the one or more of the technological trends, classify one or more of the plurality of infeasible model designs associated with the one or more of the conflicting design choice pairs potentially mitigated by the one or more of the technological trends as predictably feasible model designs, wherein the predictably feasible model designs are those infeasible model designs expected to become feasible model designs if the one or more of the technological trends continue as anticipated, including determining, for selected infeasible model designs, whether the one or more of the technological trends will mitigate, within a predefined time period in the future, the reasons why the selected infeasible model designs are not feasible;

output, for display at a display device, a user interface that includes a plurality of design choices associated with the plurality of model designs; and in response to receiving an indication of user input that corresponds to selection of a design choice of the plurality of design choices, update the user interface to indicate, based at least in part on the classification of the one or more of the plurality of infeasible model designs, that each of one or more design choices of the plurality of design choices would form, with the selected design choice, an infeasible model design that is not mitigated by the technological trends as a predictably feasible model design.

2. The system of claim 1, wherein defining the plurality of model designs includes identifying reasons why the infeasible model designs are not currently feasible; and wherein classifying one or more of the plurality of infeasible model designs as predictably feasible model designs includes determining, for selected infeasible model designs, whether the one or more of the technological trends will mitigate the reasons why the selected infeasible model designs are not feasible.

3. The system of claim 1, wherein defining the plurality of model designs includes developing and storing, in the one or more memory components, a morphological model of a design space, wherein the design space model includes the plurality of model designs.

4. The system of claim 3, wherein defining the plurality of model designs further includes identifying, as the conflicting design choice pairs, pairs of design choices in the design space that conflict with one another, such that model designs incorporating the conflicting design choice pairs are not technically feasible.

5. The system of claim 4, wherein classifying one or more of the plurality of infeasible model designs as predictably feasible model designs includes determining if all conflicting design choice pairs associated with one of the infeasible model designs are resolved via the technological trend information.

6. The system of claim 4, wherein classifying one or more of the plurality of infeasible model designs as predictably feasible model designs includes matching the one or more of the conflicting design choice pairs with the one or more of the technological trends.

7. The system of claim 1, wherein classifying one or more of the plurality of infeasible model designs as predictably feasible model designs includes generating a report listing one or more of the predictably feasible model designs and listing, for each of the one or more predictably feasible model designs listed, the one or more technological trends that helped resolve a conflict between design choices in a design space for the respective predictably feasible model design.

8. The system of claim 1, wherein the one or more processors are further configured to populate a report template with natural language descriptions of features of one or more of the predictably feasible designs, and to output a resulting natural language report about one or more of the predictably feasible designs.

9. The system of claim 1, wherein the one or more processors are further configured to:

identify one or more users indicated to have both subject matter expertise in a design space and sufficient security clearance to receive information about one or more of the predictably feasible designs; and communicate one or more of the predictably feasible designs to the identified one or more users.

10. A method, comprising:

defining a plurality of model designs, wherein the plurality of model designs;

determining that the plurality of model designs include a plurality of infeasible model designs associated with engineering design goals, including identifying reasons why the infeasible model designs associated with the engineering design goals are not currently technologically feasible due to limits in current technology, wherein the plurality of infeasible model designs incorporate conflicting design choice pairs, and wherein the conflicting design choice pairs include pairs of design choices that conflict with one another that make the engineering design goals infeasible;

receiving a plurality of trend descriptors associated with technological trends;

storing information representing technological trends and the plurality of trend descriptors;

in response to determining the plurality of infeasible model designs, determining, based at least in part on one or more of the plurality of trend descriptors, one or more of the technological trends that potentially mitigates one or more of the conflicting design choice pairs associated with one or more of the infeasible model designs;

in response to determining the one or more of the technological trends, classifying one or more of the infeasible model designs associated with the one or more of the conflicting design choice pairs potentially mitigated by the one or more of the technological trends as predictably feasible model designs, wherein the predictable feasible model designs are those infeasible model designs expected to become feasible model designs if one or more of the technological trends continues as anticipated, including determining if the one or more of the technological trends will address, within a predefined time period in the future, the technological reason why the first infeasible model design is not feasible;

outputting, for display at a display device, a user interface that includes a plurality of design choices associated with the plurality of model designs; and in response to receiving an indication of user input that corresponds to selection of a design choice of the plurality of design choices, updating the user interface to indicate, based at least in part on the classification of the one or more of the plurality of infeasible model designs, that each of one or more design choices of the plurality of design choices would form, with the selected design choice, an infeasible model design that is not mitigated by the technological trends as a predictably feasible model design.

11. The method of claim 10, wherein the plurality of infeasible model designs include a first infeasible model design, wherein the first infeasible model design is not feasible due to limits in technology;

wherein defining the plurality of model designs includes identifying one or more technological reasons why the first infeasible model design is not currently feasible; and wherein classifying one or more of the predictably feasible model designs includes determining if the one or more of the technological trends address the technological reason why the first infeasible model design is not feasible.

12. The method of claim 10, wherein defining the plurality of model designs includes performing a morphological analysis of a design space, wherein the design space includes the plurality of model designs.

13. The method of claim 10, wherein defining the plurality of model designs includes performing a General Morphological Analysis (GMA) of a design space, wherein the design space includes the plurality of model designs.

14. The method of claim 13, wherein classifying one or more of the infeasible model designs as predictably feasible model designs includes:

identifying, as the conflicting design choice pairs, the pairs of design choices in the design space that conflict with one another, such that designs incorporating the conflicting design choice pairs are not feasible; and resolving one or more of the conflicting design choice pairs by matching the conflicting design choice pair to the one or more of the plurality of technological trends.

15. The method of claim 10, wherein defining the plurality of model designs includes:

developing and storing a morphological model of a design space, wherein the design space includes the plurality of model designs; and identifying, as the conflicting design choice pairs, the pairs of design choices in the design space that conflict with one another, such that designs incorporating the conflicting design choice pairs are not technically feasible.

16. The method of claim 15, wherein classifying one or more of the infeasible model designs as predictably feasible model designs includes determining if all conflicting design choice pairs associated with one of the infeasible model designs are resolved via the information representing technological trends.

17. The method of claim 15, wherein classifying one or more of the infeasible model designs as predictably feasible model designs includes matching one or more of the conflicting design choice pairs with one or more trends from the plurality of technological trends.

18. The method of claim 15, wherein classifying one or more of the infeasible model designs as predictably feasible model designs includes applying a TRIZ framework to associate one or more of the conflicting design choice pairs with one or more of the trends from the plurality of technological trends.

19. A computer-readable data storage device storing instructions that, when executed, cause a computing device comprising one or more processors to:

define, in one or more of memory components, a plurality of model designs;

determine that the plurality of model designs includes a plurality of infeasible model designs associated with engineering goals, including identifying reasons why the infeasible model designs associated with the engineering goals are not currently technologically feasible due to limits in current technology, wherein the plurality of infeasible model designs incorporate conflicting design choice pairs, and wherein the conflicting design choice pairs include pairs of design choices that conflict with one another that make the engineering design goals infeasible;

receive a plurality of trend descriptors associated with technological trends;

store, in one or more of the memory components, information representing technological trends and the plurality of trend descriptors;

in response to determining the plurality of infeasible model designs, determine, based at least in part on one or more of the plurality of trend descriptors, one or more of the technological trends that potentially mitigates one or more of the conflicting design choice pairs associated with one or more of the infeasible model designs;

in response to determining the one or more of the technological trends, classify one or more of the plurality of infeasible model designs associated with the one or more of the conflicting design choice pairs potentially mitigated by the one or more of the technological trends as predictably feasible model designs, wherein the predictably feasible model designs are those infeasible model designs expected to become feasible model designs if one or more of the technological trends continue as anticipated, including determining, for selected infeasible model designs, whether the one or more of the technological trends will mitigate, within a predefined time period in the future, the reasons why the selected infeasible model designs are not feasible;

output, for display at a display device, a user interface that includes a plurality of design choices associated with the plurality of model designs; and in response to receiving an indication of user input that corresponds to selection of a design choice of the plurality of design choices, update the user interface to indicate, based at least in part on the classification of the one or more of the plurality of infeasible model designs, that each of one or more design choices of the plurality of design choices would form, with the selected design choice, an infeasible model design that is not mitigated by the technological trends as a predictably feasible model design.

\* \* \* \* \*